US011675821B2

(12) United States Patent
Raju

(10) Patent No.: US 11,675,821 B2
(45) Date of Patent: *Jun. 13, 2023

(54) METHOD FOR CAPTURING AND UPDATING DATABASE ENTRIES OF CRM SYSTEM BASED ON VOICE COMMANDS

(71) Applicant: Clari Inc., Sunnyvale, CA (US)

(72) Inventor: Balasubramaniam Raju, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/178,677

(22) Filed: Feb. 18, 2021

(65) Prior Publication Data

US 2021/0173859 A1   Jun. 10, 2021

Related U.S. Application Data

(63) Continuation of application No. 16/399,732, filed on Apr. 30, 2019, now Pat. No. 10,963,496.

(51) Int. Cl.
| | | |
|---|---|---|
| *G10L 15/22* | (2006.01) | |
| *G06F 16/332* | (2019.01) | |
| *G06F 16/23* | (2019.01) | |
| *G10L 15/16* | (2006.01) | |

(52) U.S. Cl.
CPC .......... *G06F 16/3329* (2019.01); *G06F 16/23* (2019.01); *G10L 15/16* (2013.01); *G10L 15/22* (2013.01); *G10L 2015/223* (2013.01)

(58) Field of Classification Search
CPC ...... G06F 16/3329; G06F 16/23; G06F 3/167; G06F 16/252; G10L 15/16; G10L 15/22; G10L 2015/223; G06N 3/0445; G06N 3/0454; G06N 3/044; G06N 3/045
USPC ......................................................... 704/270
See application file for complete search history.

(56) References Cited

U.S. PATENT DOCUMENTS

| | | |
|---|---|---|
| 10,755,171 B1 | 8/2020 | Sharifi et al. |
| 2006/0029296 A1 | 2/2006 | King et al. |
| 2015/0341492 A1* | 11/2015 | Boudrieau ............. G06Q 10/00 379/210.02 |
| 2018/0315190 A1 | 11/2018 | Sasagawa et al. |
| 2018/0373961 A1 | 12/2018 | Wang et al. |
| 2019/0311227 A1 | 10/2019 | Kriegman et al. |
| 2020/0004815 A1 | 1/2020 | Weisberg et al. |
| 2020/0026908 A1 | 1/2020 | Henderson et al. |

(Continued)

*Primary Examiner* — Charlotte M Baker
(74) *Attorney, Agent, or Firm* — Womble Bond Dickinson (US) LLP

(57) ABSTRACT

Described herein are systems and methods for facilitating the information entry and task updates to a task database in a cloud server. In one embodiment, a method includes the operations of receiving, by one or more neutral network models on a cloud server, voice instructions captured by an interactive voice response (IVR) application on a mobile device, wherein the voice instructions are to update states of one or more tasks displayed in a voice interface of the IVR application; recognizing the voice instructions and constructing appropriate texts using the one or more trained neutral network models; presenting the texts to one or more voice interfaces provided by the IVR application for confirmation by a user; and storing the user confirmed texts to a repository on the cloud server.

22 Claims, 17 Drawing Sheets

(56) References Cited

U.S. PATENT DOCUMENTS

2020/0327351 A1 10/2020 Abedini et al.
2020/0349415 A1 11/2020 Raju

* cited by examiner

| Task Categories | Beginning of Future Quarter (Q)<br><br>Specified Target Value (T) = 50<br><br>Total Realized Value (R) =<br>T / (1 + Average Addition Ratio) =<br>50 / [1 + (45.4% + 62.5%)/2] = 32.46 | Average Composition Ratio ($Comp_{avg}$) | Average Conversion Rate ($Conv_{avg}$) | Q-1 | Q-2 |
|---|---|---|---|---|---|
| Closed | 15.48 ← 15.48<br>(R * $Comp_{avg}$) / $Conv_{avg}$) = (32.46 * 47.7%) / 100% = 15.48 | 47.7% | 100% | 10 → 10<br>Conv = 100%<br>Comp = 45.5% | 12 → 12<br>Conv = 100%<br>Comp = 50% |
| Commit | 15.47 ← 11.99<br>(R * $Comp_{avg}$) / $Conv_{avg}$) = (32.46 * 36.95%) / 77.5% = 11.99 | 36.95% | 77.5% | 12 → 9<br>Conv = 75%<br>Comp = 40.9% | 10 → 8<br>Conv = 80%<br>Comp = 33% |
| Pipeline | 21.85 ← 4.91<br>(R * $Comp_{avg}$) / $Conv_{avg}$) = (32.46 * 15.15%) / 22.5% = 4.91 | 15.15% | 22.5% | 15 → 3<br>Conv = 20%<br>Comp = 13.6% | 16 → 4<br>Conv = 25%<br>Comp = 16.7% |
| New Tasks | 17.52 | N/A | N/A | 10<br>Addition = 45.4% | 15<br>Addition = 62.5% |
| Total Tasks | 50 | N/A | N/A | 32 | 39 |

FIG. 12

METHOD FOR CAPTURING AND UPDATING DATABASE ENTRIES OF CRM SYSTEM BASED ON VOICE COMMANDS

RELATED APPLICATIONS

This is a continuation application of U.S. patent application Ser. No. 16/399,732, filed Apr. 30, 2019, which is incorporated by reference in its entirety.

TECHNICAL FIELD

Embodiments of the present invention relate generally to cloud servers and communication systems. More particularly, embodiments of the invention relate to capturing and updating database entries of database systems based on voice commands.

BACKGROUND

People typically work on multiple tasks and can be extremely busy. Sometimes, they attend professional meetings, expositions, marketing events, and come to their offices or homes with useful information on physical mediums, such as flyers, brochures, pamphlets, and business cards. These physical mediums can contain new contact information or information for new tasks. Timely and accurately keying in the information on the physically mediums into the task database can be time-consuming and tedious, and can present an inconvenience for them at the end of a busy day. Similarly, updating tasks in a task database also requires tedious and time-consuming manual keying-in, since a task in the task database may have multiple fields to be updated to move the task from one stage to another.

Therefore, it would be desirable that users of such database systems could enter information on the physical mediums into the database and update tasks in the database without the tedious manual keying-in and without sacrificing input accuracy.

BRIEF DESCRIPTION OF THE DRAWINGS

Embodiments of the invention are illustrated by way of example and not limited to the figures of the accompanying drawings in which like references indicate similar elements.

FIG. 12 further illustrates a table showing example historical task data that can be used to construct a suggested task set in accordance with an embodiment of the invention.

DETAILED DESCRIPTION

Figure 1:
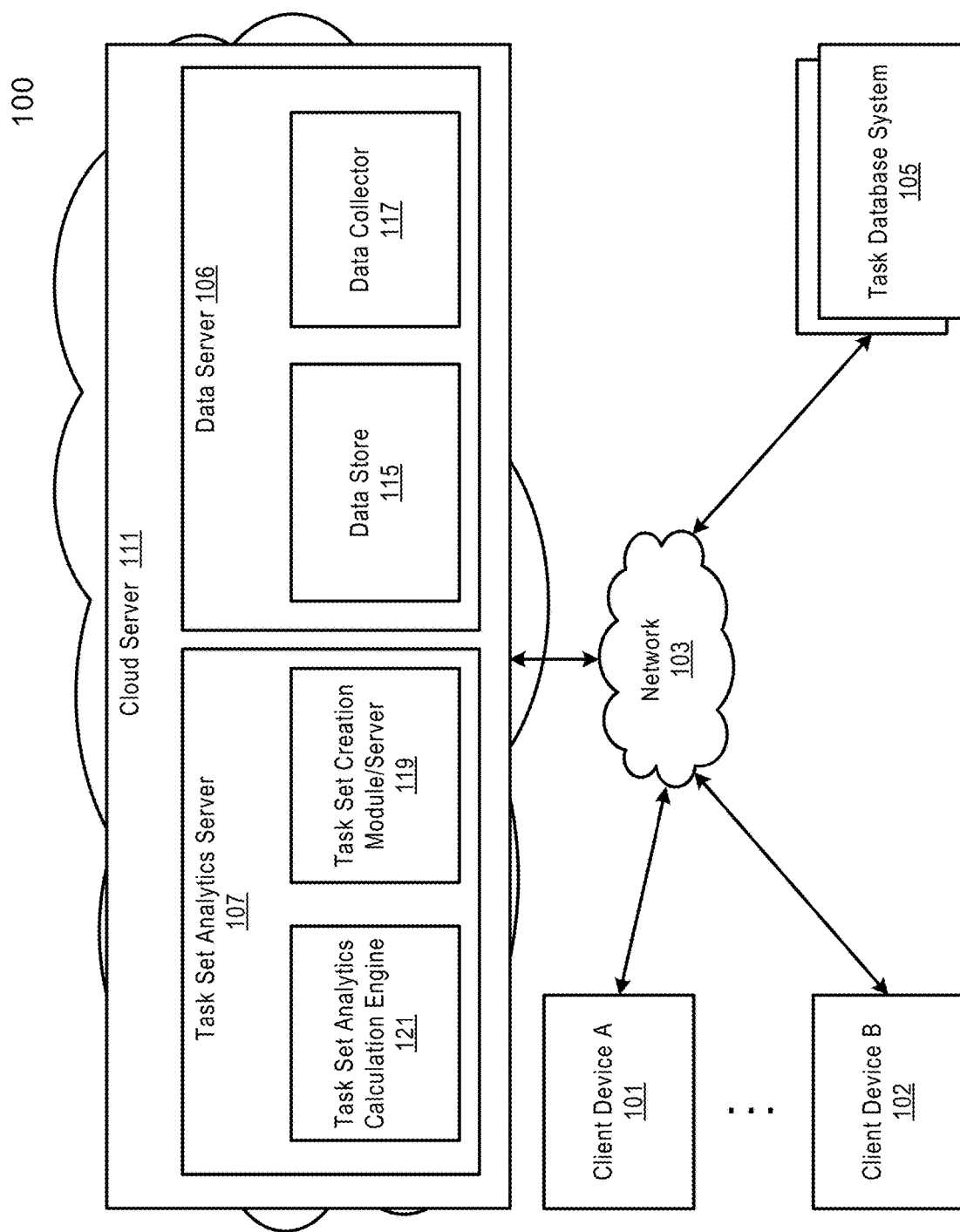
FIG. 1 is a block diagram illustrating a network configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" or "in an embodiment" in various places in the specification do not necessarily all refer to the same embodiment.

Described herein are systems and methods for facilitating the information entry and task updates to a task database in a cloud server. The task database is in synchronization with a customer relationship management (CRM) system. The systems and methods described herein enable users to update the task database and enter information into the task database in a timely manner such that the task database can stay updated. The various embodiments can free users of CRM systems, such as sales representatives and marketing personnel, of the burden of manually keying-in the information. The time saved can be translated into more selling, thus generating more top line sales. The updated database can also be used to construct a suggested task set at the beginning of a period of time to meet a preset target sales value for the end of the period of time.

In one embodiment, a method of updating data entries of a database system includes the operations of receiving, at a cloud server, an image from a mobile device over a network, wherein the image was taken using a camera of the mobile device capturing an exterior surface of a physical medium; applying one or more neutral network models to the image to recognize, extract, and categorize content data representing content information printed on the exterior surface of the physical medium according to a predetermined category list. The method further incudes the operations of transmitting the content data to the mobile device over the network to be displayed by a mobile application running on the mobile device for editing and confirmation by a user; and in response to a confirmation received from the mobile application of the mobile device, updating one or more data entries of a database hosted by a database management system based on the content data, without requiring the user to separately access the database for updating the one or more data entries.

In one embodiment, the physical medium comprises a contact information card that can include contact information of another user associated with the contact information card. The confirmation received from the mobile application includes modified content data modified by the user in response to the transmitted content data. The one or more data entries are updated based on the modified content data.

In one embodiment, updating one or more data entries of a database comprises accessing the database and authenticating the user based on a device identifier (ID) of the mobile device; in response to successfully authenticating the user, identifying the one or more data entries based on a category associated with the content data categorized according to the predetermined category list; and modifying one or more fields of the identified data entries based on the content data.

In one embodiment, applying one or more neutral network models to the image to recognize, extract, and categorize content data comprises: extracting a set of features from the image; performing an image recognition process on the set of features to recognize a layout of the image; performing a natural language process (NLP) on the set of features to recognize and extract text information from the image, wherein the content data includes at least the text information. The category list includes a name, an address, one or more phone numbers, a web address, an email address, a tagline or description of service, and QR code.

In one embodiment, the one or more neural network models include a convolutional neural network (CNN) and a short-term memory (LSTM) network. The neutral networks are trained using Word2Vec training data to recognize characters in the image and construct appropriate words using natural language processing, and to match the extracted contact information to one or more categories of the category list. The trained neural network models are deployed on a machine learning server in the cloud server.

The disclosure also describes various embodiments for capturing task update details from voice instructions. A method of capturing details from voice instructions to update tasks in a customer relationship management (CRM) system include the operations of receiving, at a cloud server over a network, voice instructions captured by an interactive voice response (IVR) application running on a mobile device, wherein the voice instructions are to update states of one or more tasks of a task database system; applying a neutral network model to the voice instructions, including performing a speech-to-text (STT) process on the voice instructions to convert the voice instructions to a text stream, and performing a natural language process (NLP) on the text stream to recognize data to be updated and a target task to be updated. The method further includes the operations of transmitting the data to be updated and a target task to be updated to the mobile device over the network for confirmation by a user associated with the mobile device; and in response to a confirmation received from the mobile device, transmitting a database update command to the task database system to update one or more fields of the target task based on the data to be updated.

In one embodiment, the repository is a database server in the cloud server, and includes a gatekeeper component to resolve conflicts between the user-edited and confirmed texts and existing tasks in the database server. The texts represent updates one or more tasks from one stage to another stage. The updated tasks are to be used in constructing a suggested task set at the beginning of a time period for an achieving a target value at the end of the time period. The suggested task set is constructed by the cloud server historical task data in the database server.

In one embodiment, the one or more displayed tasks in the voice interface are preconfigured by a user. The one or more displayed tasks in the voice interface are based on one or more emails generated by a pending activity reminder module in the cloud server. Each of the emails is sent by an outside contact associated one of the one or more displayed tasks.

In one embodiment, the one or more trained neural network models include a voice recognition component and at least one a natural language processing neutral network. The one or more trained neural network models are deployed on a machine learning server in the cloud server.

The various embodiments described in the disclosure can facilitate the entry and updates of CRM data in a database base that is in synchronization with a CRM system, or CRM data in a CRM system. The timeliness and accuracy of the CRM data can improve the accuracy of various forecasting activities, thereby assisting in revenue growth of a sales company.

Cloud Server

FIG. 1 is a block diagram illustrating a network configuration according to one embodiment of the invention. Referring to FIG. 1, system 100 includes one or more clients 101-102 communicatively coupled to a cloud server 111 and a task database system 105 over network 103. The cloud server 111 can further include a data server 106, and a task set analytics server 107.

Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless.

In one embodiment, the task database system 105 can be a customer relationship management (CRM) system that store historical data and/or raw opportunity. The task database system 105 provides task data services and data to a variety of clients, which may be periodically or constantly accessed and updated by the clients for managing their task management data.

The data server 106 and the task set analytics server 107 can be any kinds of servers, for example, Web servers, application servers, cloud servers, backend servers, etc. The data server 106 can include a data store 115 and a data collector 117. The data collector 117 can connect using a variety of communication protocols to the task database system 105, and can be periodically updated from the task database system 105 or another data source or data provider. The data server 106 can perform Extract, Transform and Load (ETL) operations, and save the preprocessed data into a data store 115, and can allow the task set analytics calculation engine 121 to dynamically access task data in a ready-to-use fashion through the data collector 117. Data stored in the data store 115 can be maintained in a variety of data structures, such as tables or databases.

In an embodiment, the cloud platform server 111 can be provided between client devices 101-102 and the task database system 105. Users at client devices 101-102 can log in to the cloud server 111, which can utilize services and data provided by the task database server 105. As such, the cloud server 111 operates to add a layer of intelligence to the task database system 105. The cloud server 111 provides a number of predictive algorithms based on AI and machine learning technologies, for use in identifying risks and delivering predictive insights using data gathered from a number of sources.

For example, the cloud server 111 can provide users with insights into which tasks are most likely to complete and which tasks are at the highest risk of slipping, to enable the users to focus their resources on the right tasks. The cloud server 111 can provide the above-mentioned insights by analyzing all tasks over a predetermined period of time in the past, e.g., over the past two years, and use a model (e.g., hidden Markov model) and one or more AI classification algorithms to identify patterns and factors that drive those tasks that were successfully completed and those tasks that failed to complete.

The cloud server 111 can perform a number of additional functions using modules/servers executing in the cloud server 1111. As shown in FIG. 1, the cloud server 111 can use the task set analytics server 107 to prepare corresponding historical data for use by the task set creation/server 119. The task set analytics engine can prepare/calculate final results in a real-time fashion.

The task set creation module 119 can be used to construct a proposed task set (e.g., a pipeline) needed at the beginning of a future time period, in order to hit a quota for the end of the future time period. The module can analyze patterns of open tasks at the beginning of past quarters, and can predict the composition of the proposed pipeline needed to hit the quota based on historical data.

Contact Capture from Physical Mediums

Figure 2:
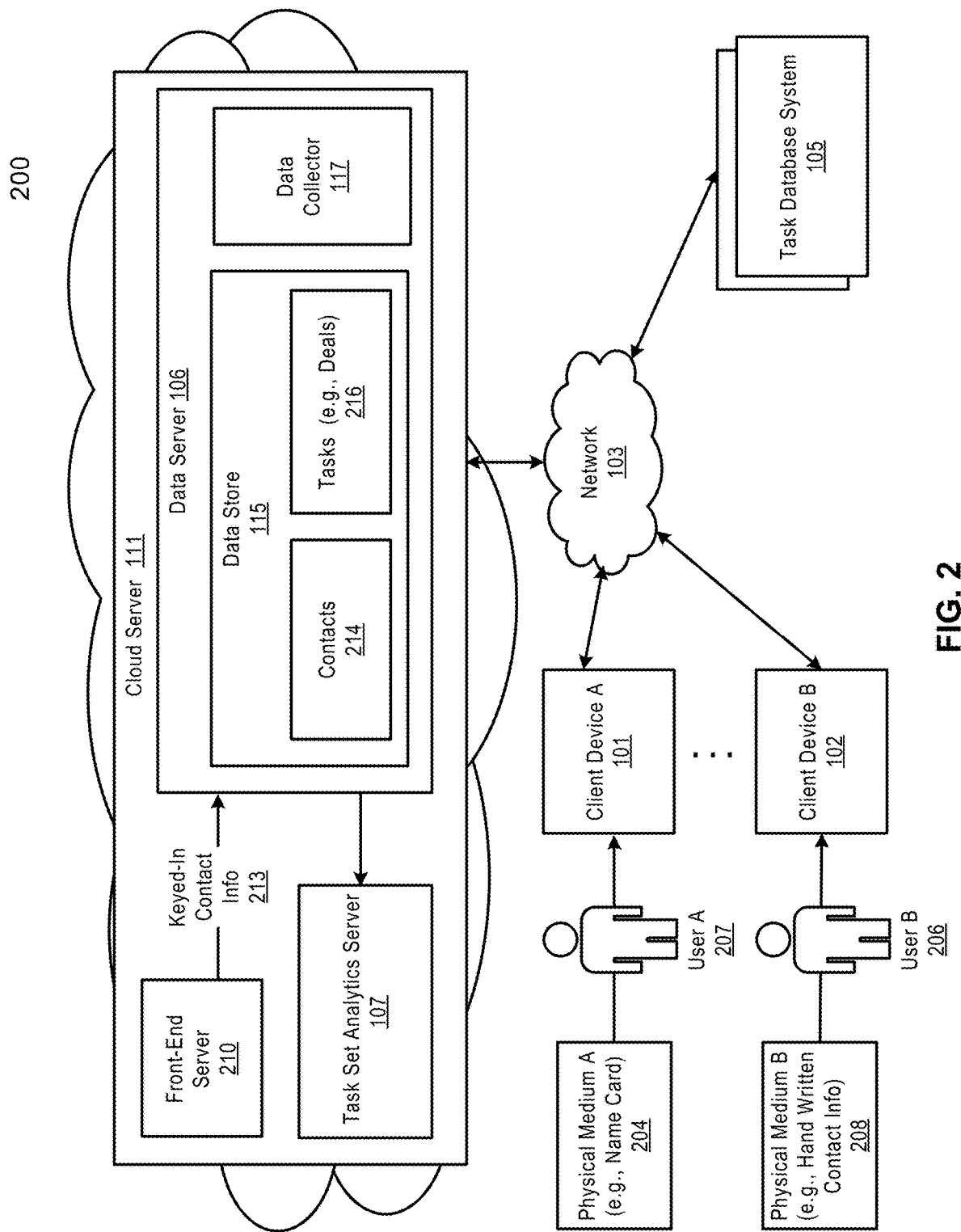
FIG. 2 illustrates an example configuration of a system for capturing contact information from physical mediums through manual keying-in in accordance with an embodiment.

FIG. 2 illustrates an example configuration of a system for capturing contact information from physical mediums through manual keying-in in accordance with an embodiment.

As shown in FIG. 2, the cloud server 111 can include the front-end server 710, which is configured to receive contact information that are manually typed in by users using various client devices.

For example, user A 207 may be a sales representative who has received physical medium A 204 (e.g., a name card) at a networking meeting, while user B 206 may have attended the same networking meeting and received physical medium B (e.g., handwritten contact information) 208.

Physical medium A 204 may be from a person who has no business relationship with the company that user A 207 works for, while physical medium B 208 may be from a person who has an existing business relationship with user B 206 but who has changed his or her cell phone number. User A 204 and user B 208 need to manually type in the information in the physical mediums using client device 101-102 if they want to enter the information in a database.

The front-end server 210 can host a cloud service that provides a number of graphical user interfaces for the users to manually enter contact information on the physical mediums into the data store 115 in the data server 106.

As shown, the keyed-in contact information can be saved as pure contacts 214 as potential opportunities, or as new or potential tasks 216. As described above, manually keying-in information to the data server can be time-consuming.

Figure 3:
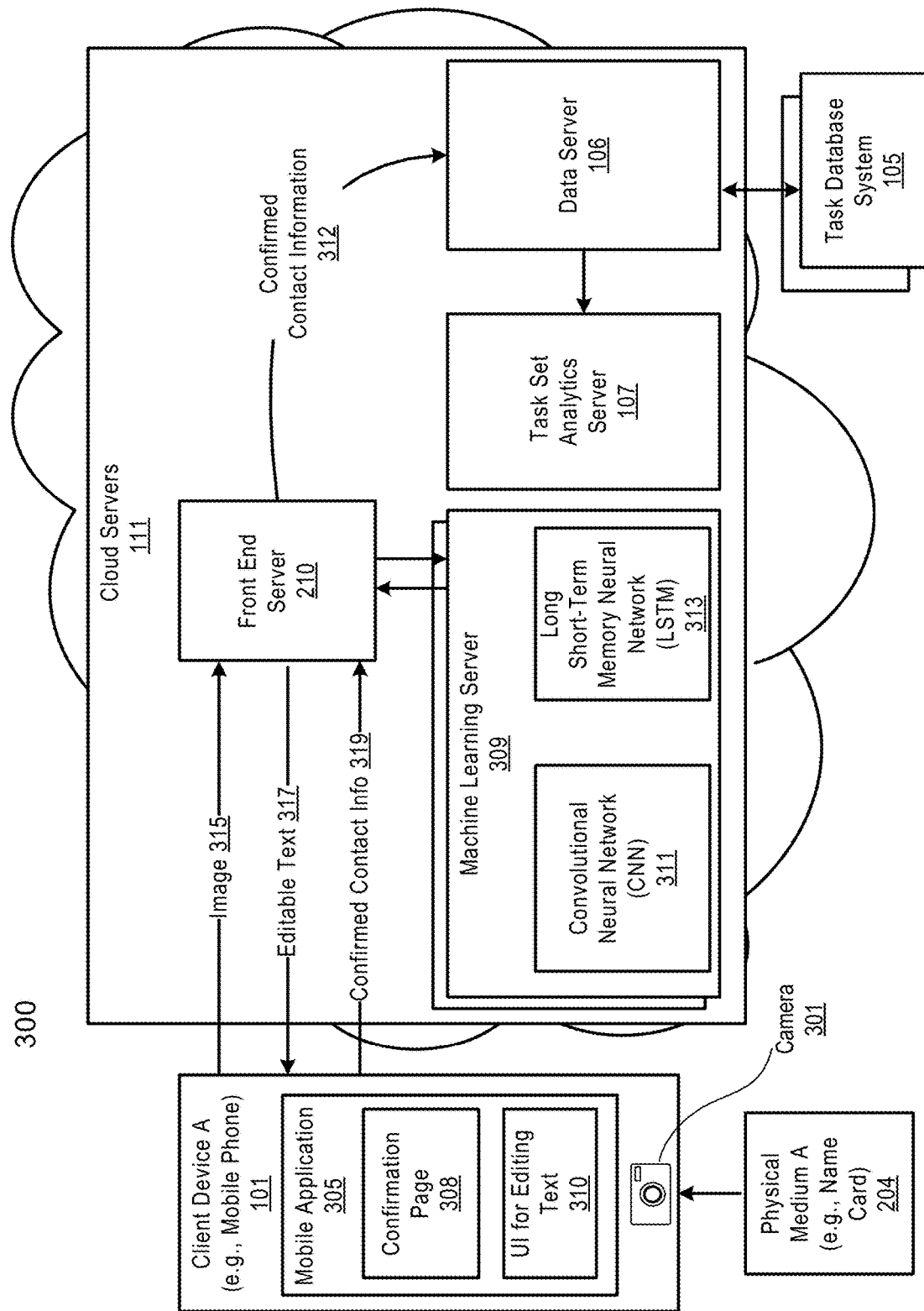
FIG. 3 illustrates an example of a system for capturing contact information from physical mediums using a point-snap-capture feature in accordance with an embodiment.

FIG. 3 illustrates an example of a system for capturing contact information from physical mediums using a point-snap-capture feature in accordance with an embodiment.

The system includes one or more trained deep neural network (DNN) models hosted by a machine learning server 309 in the cloud server 111. As shown in FIG. 3, a convolutional neural network (CNN) 311 and a long short-term memory neural network (LSTM) can be hosted on the machine learning server 309.

A mobile application 305 that runs on client device A 101 can be used by a user (e.g., user A 207 in FIG. 2) to take a picture (i.e. image) of the area where contact details are displayed in the physical medium 204, and send that information to the front-end server 210. The user can determine which area contains the contact information that needs to be entered into the data server 106, and point the camera 301 at the area, and take the picture.

The mobile application 305 can process the image taken and send the image 315 to the front-end server 210. The front-end server 210 can be a web server with a load balancer that distributes network or application traffic across a number of machine learning servers, including the machine learning server 309.

For example, the image 315 can be distributed to the machine learning server 309 by the front-end server 210, as an input to the CNN 311, which can extract contact details of the contact person from the image 315, such as the name, the email address, the phone number, and the LinkedIn profile URL.

The CNN 311 can forward its output to the LSTM 313 for sequence prediction. The CNN 311 and the LSTM 313 in combination forms a CNN LSTM model, which has been trained using Word2Vec datasets. Word2Vec itself can represent a group of related models used to produce word embeddings. Word embedding is a vector representation of document vocabulary and can be used to capture context of a word in a document, semantic and syntactic similarity, relation with other words.

The CNN LSTM model can recognize characters from the image 315, and construct appropriate words from the characters. In one embodiment, the CNN LSTM model can use the CNN layers 311 for feature extraction on the image 315 to generate textual descriptions of the image 315. The output of the CNN 311 can be provided as an input to the LSTM 313 to generate sentences or phrases, with each phrase or sentence representing an element in a predetermined category list. The generated phrases and sentences can be organized in an order as specified by the predetermined category list.

In one embodiment, the creation of the predetermined category list can be part of the CNN LSTM model training process. Examples of elements in the category list can include a name, an address, one or more phone numbers, a web address, an email address, a tagline or description of service, and QR code.

As further shown in FIG. 3, the texts generated by the machine learning server 309 from the image 315 can be sent back as editable text 317 to the mobile application 305, which can provide a graphical user interface 310 for the user to edit the text 317.

For example, the user may correct a spelling error and one or more informalities in the editable texts 317 through the graphical user interface 310. Once the text editing is completed, the user is prompted to confirm the user-edited text in another graphical user interface (e.g., confirmation page 308) for confirmation. The confirmed contact information 319 can be sent back to the front-end server 210, which saves the contact information 312 to the data server 105 for use by the task analytics server 107 to construct a suggested data set, as described in details in FIGS. 1-6 and the related text of this disclosure.

Figure 4:
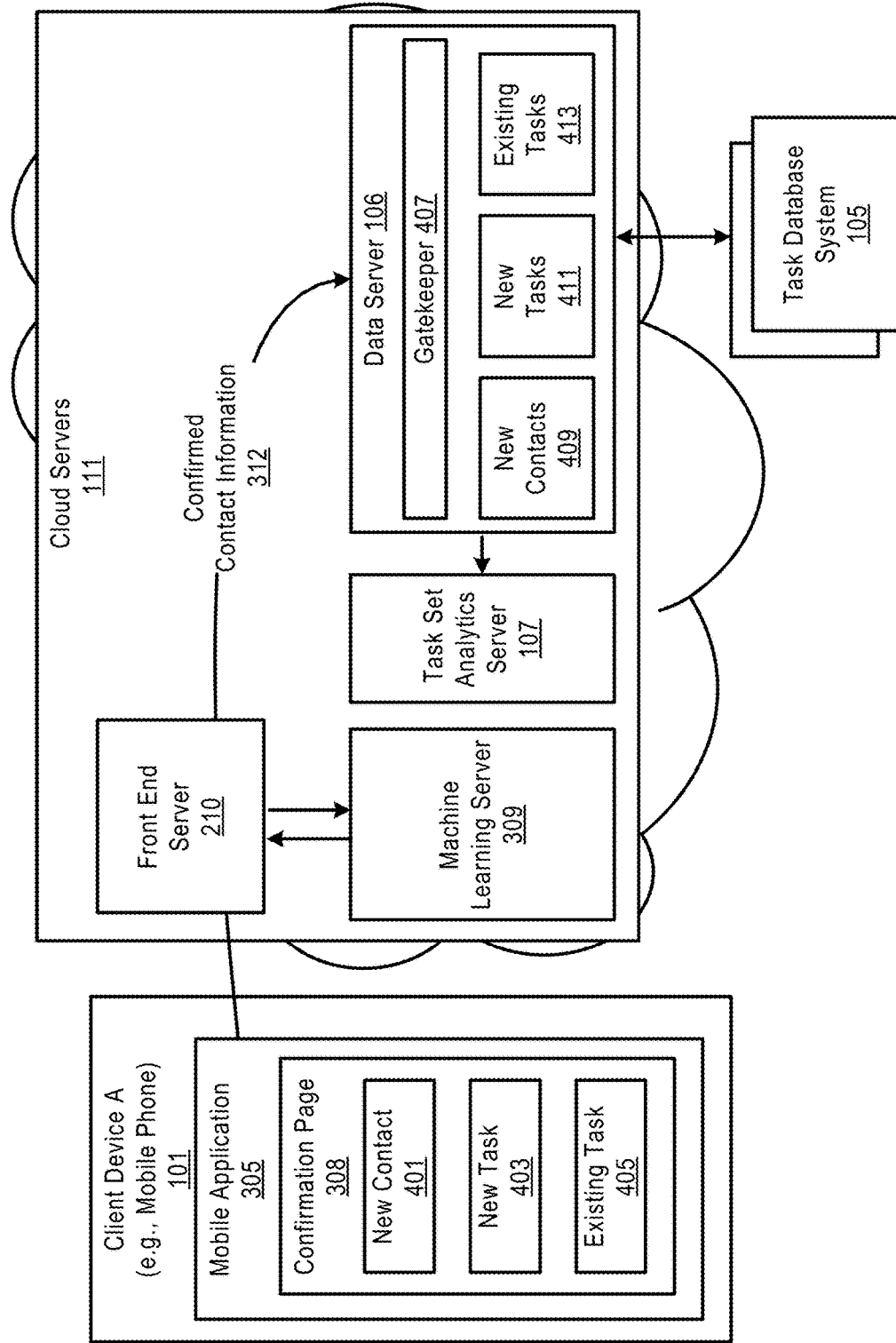
FIG. 4 further illustrates an example of a system for capturing contact information from physical mediums using a point-snap-capture feature in accordance with an embodiment.

FIG. 4 further illustrates an example of a system for capturing contact information from physical mediums using a point-snap-capture feature in accordance with an embodiment.

As shown, the conformation page 308 can provide several options for the user to select. For example, the user can select to save the user-edited text/contact information as a new contact 401, a contact of a new task 403, or a contact of an existing task 405. The user can make a selection based on his judgement and personal knowledge of the tasks in the data sever or the task database system 105.

In one embodiment, when the user-edited contact information is to be saved as a new contact, the contact information is not to be associated with any new task or existing task. Instead, the data server 407 would treat the contact information as a potential task. When the user-edited contact information is to be saved as a contact of a new task, the person in the contact information may have agreed to make purchases from the sales company. Therefore, a task in the stage of "New" will be created in the data server 106. When the user-edited contact information is to be saved as a contact of an existing task, the person in the contact information is already listed as a target contact on at least one task in the data server 106.

However, the user's judgement may not always be correct. Therefore, before the confirmed contact information 312 is persisted to the data server 106, a gatekeeper component 407 executing thereon can be invoked to validate the contact information 312 and resolve any conflicts with existing records in the data server 106.

For example, if the user chooses to save the contact information 312 as a new contact, and the gatekeeper component 407 determines that the data server 106 already has an existing record for the confirmed contact information 312 associated with an existing task based on a predetermined algorithm, the gatekeeper component 407 would disregard the user's selection and replace the existing contact with the contact information 312.

In one embodiment, corresponding to the available selections in the confirmation page 308, the data server 106 can include multiple tables 409, 411 and 413 to store the user confirmed contact information 312 subject to the validation of the gatekeeper component 407.

Figure 5:
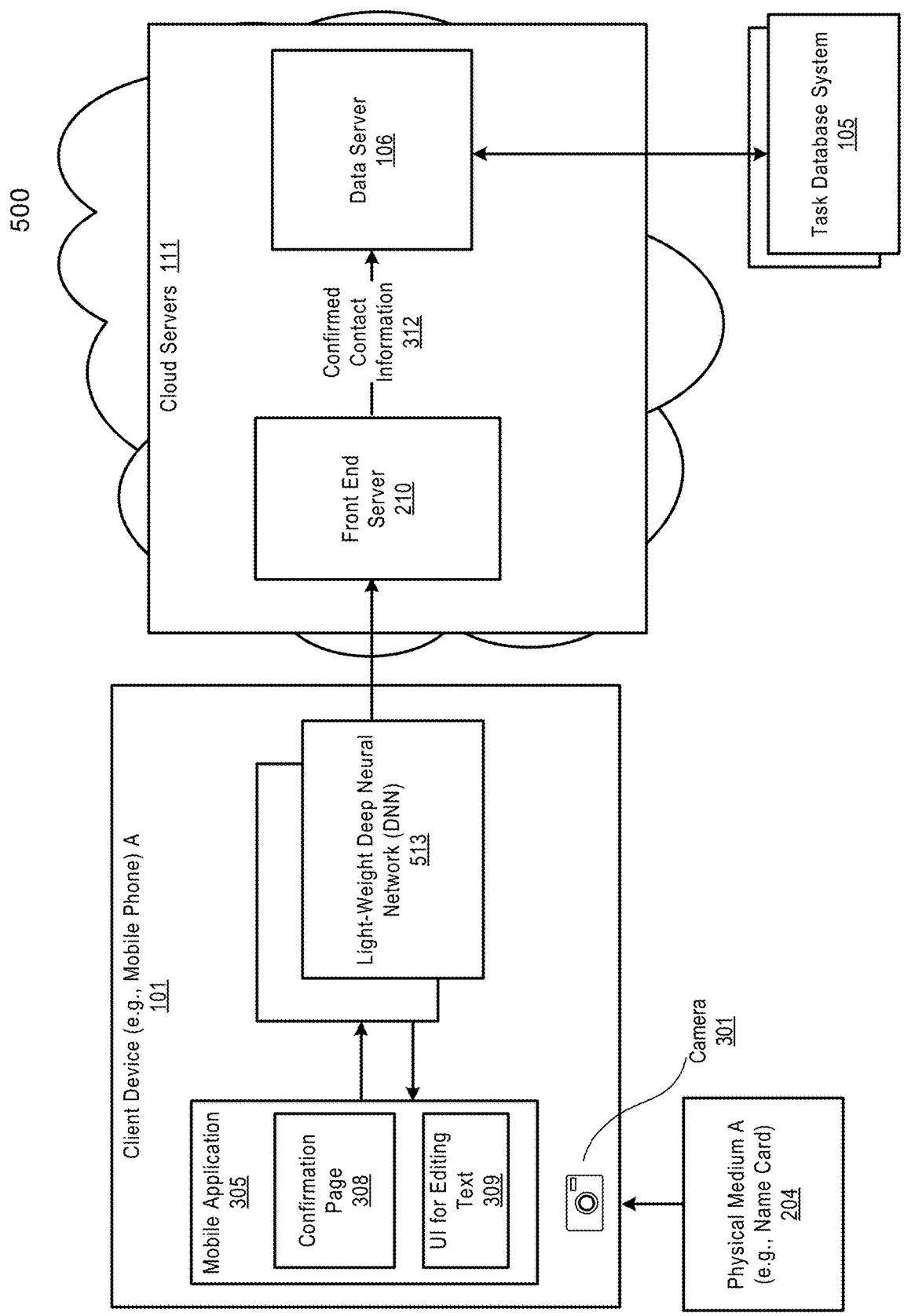
FIG. 5 illustrates another embodiment of a system for capturing contact information from physical mediums using a point-snap-capture feature in accordance with an embodiment.

FIG. 5 illustrates another embodiment of a system for capturing contact information from physical mediums using a point-snap-capture feature in accordance with an embodiment.

Instead of hosting the CNN LSTM model on the machine learning server 309 as shown in FIG. 3 and FIG. 4, a low-footprint deep neural network (DNN) 513 can be embedded in the mobile device 101.

In one embodiment, the low-footprint deep neural network (DNN) 513 is a light version of the CNN LSTM model, which can be created by employing techniques such as reducing the depth of the neural network or creatively alternating various layers. The low-footprint DNN 513 can eliminate the need for hosting the trained model in the cloud server 111, thus eliminating the need for making a round-trip request to the server from the mobile device 101 to obtain the contact details extracted from an image.

Figure 6:
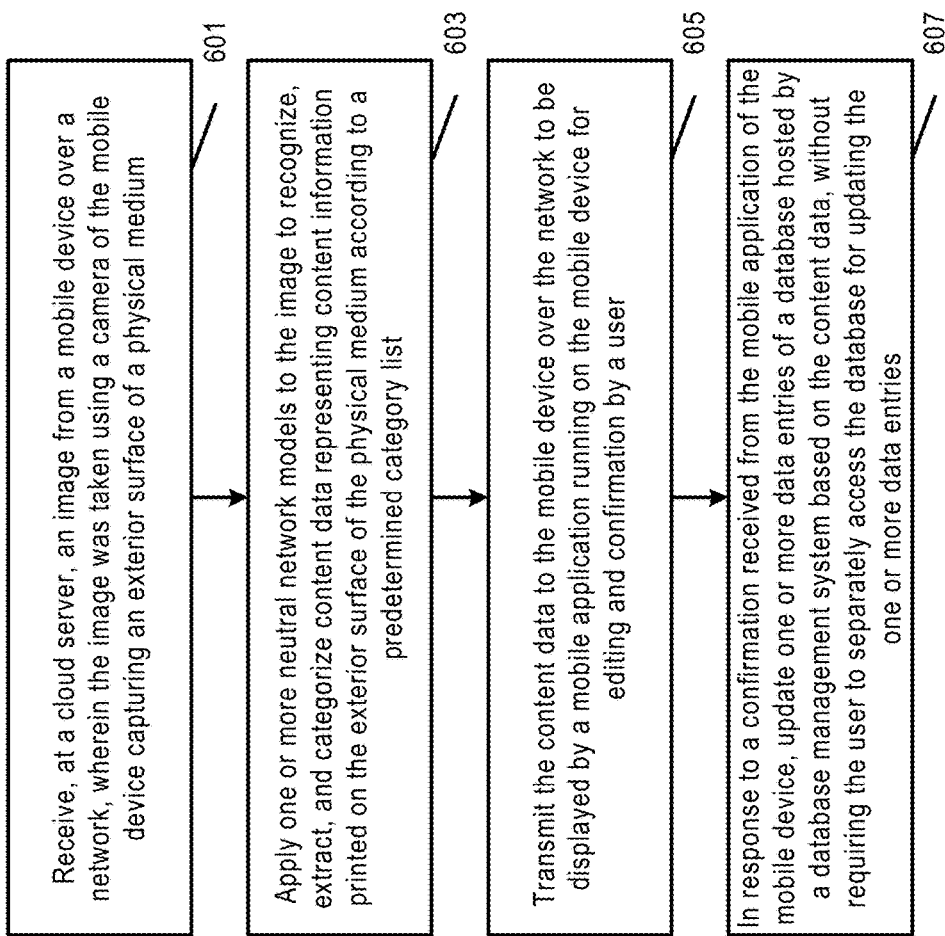
FIG. 6 illustrates a process for capturing contact information from physical mediums using a point-snap-capture feature in accordance with an embodiment.

FIG. 6 illustrates a process for capturing contact information from physical mediums using a point-snap-capture feature in accordance with an embodiment.

As shown in FIG. 6, the process may be performed by process logic that includes software, hardware, or a combination thereof. For example, the process may be performed one or more of the mobile application 305, the front-end server 210 or the machine learning server 309.

Referring to FIG. 6, an image is received at a cloud server from a mobile device over a network. The image was taken using a camera of the mobile device capturing an exterior surface of a physical medium. In operation 603, one or more neutral network models are applied to the image to recognize, extract, and categorize content data representing content information printed on the exterior surface of the physical medium according to a predetermined category list. In operation 605, the content data is transmitted to the mobile device over the network to be displayed by a mobile application running on the mobile device for editing and confirmation by a user. In operation 607, in response to a confirmation received from the mobile application of the mobile device, one or more data entries of a database hosted by a database management system are updated based on the content data, without requiring the user to separately access the database for updating the one or more data entries.

Task Updates Using Voice Instructions

Figure 7:
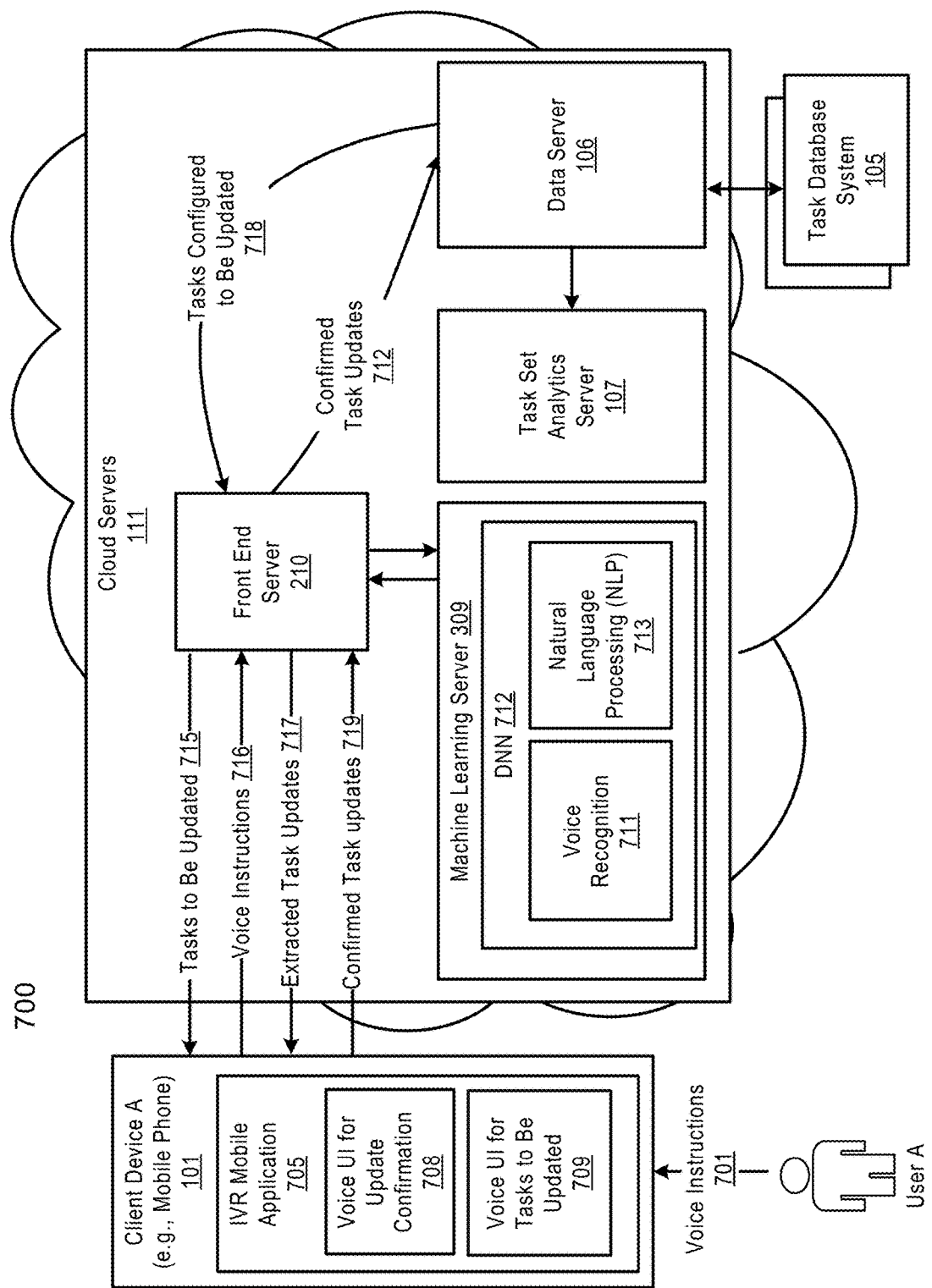
FIG. 7 illustrates an example of a system for capturing details from voice instructions to update tasks in a customer relationship management (CRM) system, in accordance with an embodiment.

FIG. 7 illustrates an example of a system 1200 for capturing details from voice instructions to update tasks in a customer relationship management (CRM) system, in accordance with an embodiment.

As shown in FIG. 7, a voice interactive response (IVR) mobile application 705 can be provided in the client device 101. The IVR mobile application 705 can capture voice instructions from user A 208 for updating tasks 715 retrieved from the data server 106, and send the captured voice instructions 716 to the front-end server 210. The front-end server 210 can include a load balancer configured to distribute network or application traffic across a number of machine learning servers, including the machine learning server 309.

For example, the captured voice instructions 716 can be distributed to the machine learning server 309 by the front-end server 210, as an input to a trained DNN model 712. The DNN model 712 can include one or more layer for voice recognition 711 and one or more layers for natural language processing (NLP) 713.

The DNN model 712 can have one of a variety of architectures that are built using different types of neural network models. For example, the DNN model 712 can be built using a multilayer perceptron (MLP) that utilizes a nonlinear activation function (e.g., hyperbolic tangent or logistic function) to classify voice data that is not linearly separable. As another example, the DNN model 712 can be built using a recurrent neural network (RNN), which is a variant of a recursive artificial neural network in which connections between neurons make a directed cycle, where output depends not only on the present inputs but also on a previous step's neuron state.

After the DNN model 712 recognizes the voice instructions 716 and constructs appropriate texts from the voice instructions 716, the front-end server 210 can send the texts representing task updates 717 extracted from the voice instructions 716 back to the client device 101 for confirmation through a voice user interface 708. The confirmed task updates 719 can subsequently be sent to the front-end server 210, which can save the confirmed task updates 712 to the data server 106.

As further shown in FIG. 7, a voice UI for tasks to be updated 709 can be provided by the IVR mobile application 705 for displaying tasks 715 that can be updated by user A 208. User A 208 can speak to the client device through the IVR mobile application 705 as to which task of the displayed tasks 715 to update, how to update the task. These tasks 718 are generated by the front-end server 210 based on a variety of configurations therein. The front-end server 210 can send the tasks 715 to the voice UI 709.

Figure 8:
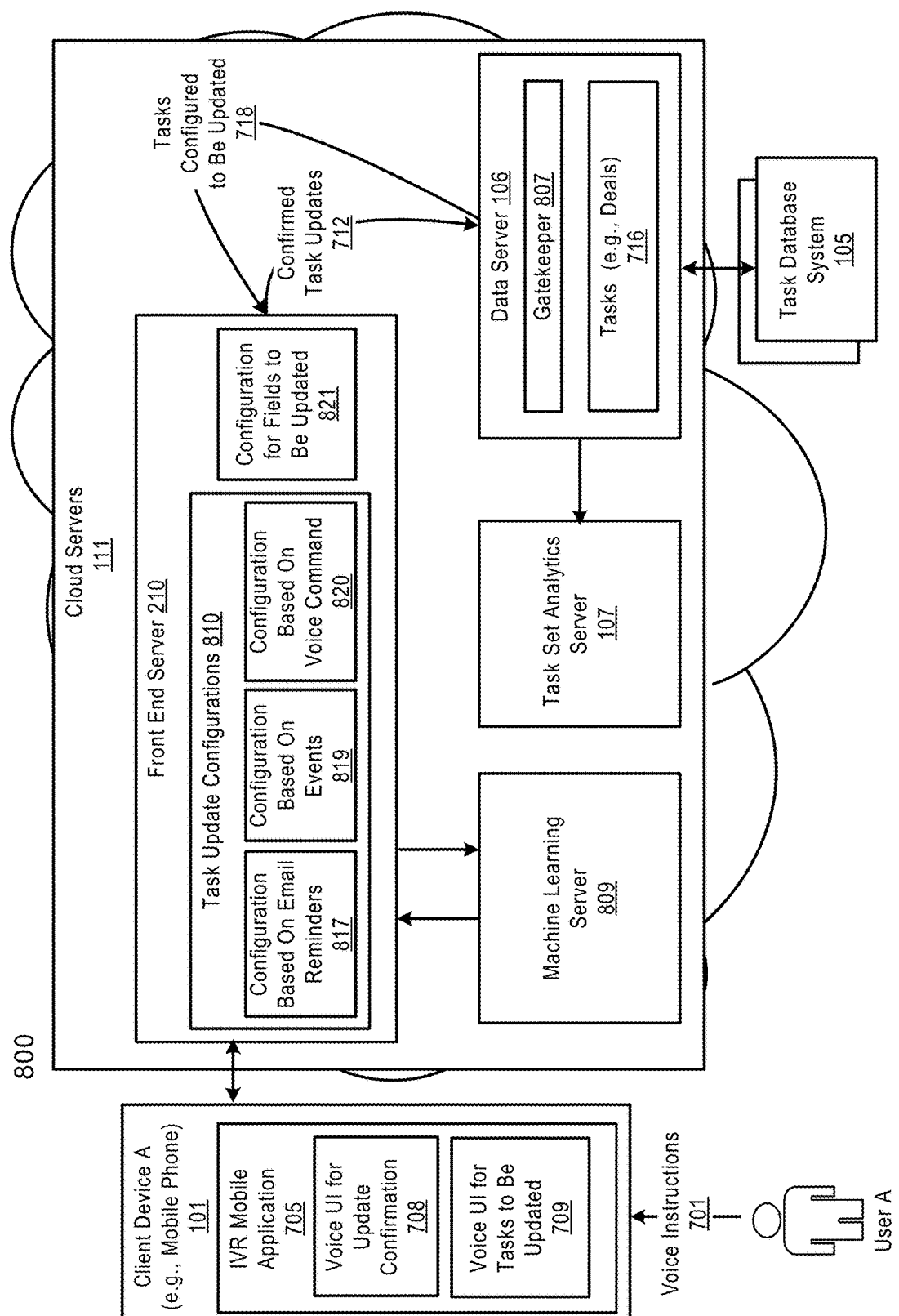
FIG. 8 further illustrates the example system of FIG. 7 for capturing details from voice instructions to update tasks in a customer relationship management (CRM) system, in accordance with an embodiment.

FIG. 8 further illustrates the example system 700 for capturing details from voice instructions to update tasks in a customer relationship management (CRM) system, in accordance with an embodiment.

As shown in FIG. 8, a variety of configuration settings in the data server 210 can be provided to generate tasks to be updated through the voice UI 709. The configuration settings can include a configuration setting based on reminders 817, a configuration setting based on events 819, and a configuration based on a voice command 820. Additionally, the front end server 210 can include a configuration setting 821 that specifies which fields to update for the tasks 718 that are generated by the front end server 210 based one of configurations 817, 819, and 820.

In one embodiment, when the configuration setting 817 is activated, the front-end server 210 can call one or more other modules in the cloud server 111 to generate a list of tasks from tasks 216 stored in the data server 106 based on a list of emails. Each email on the email list can be an email from an outside contact of a task that the user has been assigned to work on, but the user has not been replied yet after a predetermined period of time. The tasks associated with the emails on the email list can be extracted from the data server to constitute the task list for display in the voice UI 709. Before sending the tasks to the voice UI 709 for display, the front-end server 210 can specify one or more fields for each of the generated tasks based on the configuration 821.

In one embodiment, when the configuration setting 819 is activated, the front-end server 210 can call one or more other modules in the cloud server 111 to generate a list of tasks based on calendar events scheduled within a predetermined period of time for a user (e.g., user A 208). For example, if the calendar of the user has a meeting scheduled on Monday to discuss tasks assigned to him with the user's supervisor, the front-end server 210 would automatically generate a task list including the tasks to be discussed in the meeting for the user to update one or two days (depending on the configuration 819) before the scheduled meeting.

In one embodiment, the configuration 817 and the configuration 819 can be simultaneously activated (i.e., enabled for generating tasks for updating), in which case the front-end server 210 can generate a task list including both tasks generated based on the configuration 817 and tasks generated based on the configuration 819.

In one embodiment, when the configuration 820 is activated, the IVR mobile application 705 can display an additional voice UI (not shown in FIG. 8) for user A 208 to explicitly specify through a voice instruction which task(s) to update.

For example, the user can say "Please update task A for company A". In response, the IVR mobile application 705 can transfer the voice instruction to the front-end server 210, which would use the machine learning server 309 to convert the voice instruction into texts. The front-end server 210 can use the texts to perform a query on the data server 106 to generate one or more tasks assigned to the user for display in the voice UI 709.

As further shown, a gatekeeper 807 can be provided in the data server 106 to validate any task updates or resolve conflicts before committing the confirmed task updates 712 to the data server 106.

The gatekeeper 807 can validate if the task updates confirmed by the user is appropriate. For example, if the confirmed task updates would update a task from the "pipeline" stage to the "commit" stage, and the task is already closed, the gatekeeper 807 would disregard the task update request and send an error message to the IVR mobile application 705 to notify the user of the update error.

Figure 9:
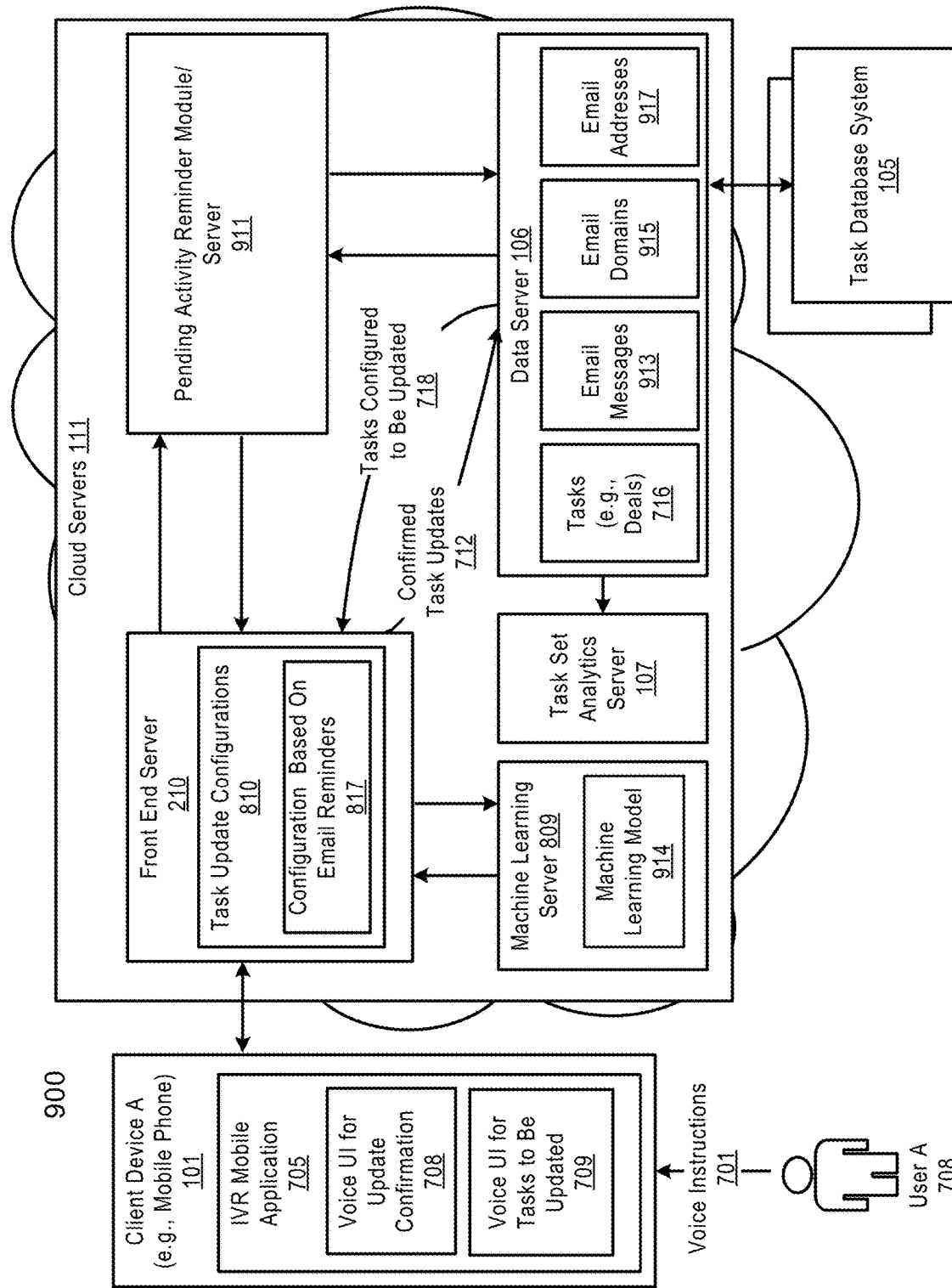
FIG. 9 illustrates an example system for generating a list of tasks to be updated based on email reminders in accordance with an embodiment.

FIG. 9 illustrates an example system 900 for generating a list of tasks to be updated based on email reminders in accordance with an embodiment.

In one embodiment, when the configuration 817 is activated, the front end server 210 can call a pending activity reminder module 911 to generate a list of emails that each needs a reply. Each email is from an outside contact of a particular task assigned to the user (i.e. user A 208). Tasks associated with the list of emails would constitute the tasks to be displayed in the voice UI 709 for the user to update using voice instructions.

In one embodiment, to generate the email list, the cloud server 111 can connect to the data server 106 which is automatically synchronized with the task database system 105, to determine open tasks assigned to the user, and to determine source contacts and target contacts of the open deals. The cloud server 111 can further determine emails domains 915 for the open tasks, including source email domains for the source contacts and target email domains for the target contact. Email addresses 917 for the tasks can also be determined by the pending activity reminder module 911. The emails addresses 917 can include one or more target email addresses that are determined based on the target email domains and the target contacts, and one or more source email addresses determined based on the source email domains and the source contacts. Email messages 913 associated with the open tasks can be located from the database server or another server based on the email addresses 917.

The pending activity reminder module 911 can subsequently identify one or more email threads (i.e. groups) from the email messages 913, and sort each email thread in a reverse chronologically order, with the most recent emails on the top of the sorted group of emails. In one embodiment, an email group represents an email thread with a thread ID, and includes email messages exchanged between a source contact and one or more target contacts. The first email in an email group can be an email message sent by a source contact or received by a source from a target contact. The remaining emails in the group can include emails exchanged between the source contact and the target contact.

For each email thread, the pending activity reminder module 911 can determine whether the latest email is written by a source contact or a target contact. If the latest email is written by a target contact, that latest email can be included in an email list.

The pending activity reminder module 911 can trim the email list by excluding those emails with timestamps that are more recent than a predetermined timestamp. The predetermined timestamp can be configured by the configuration 817.

For example, based on the configuration setting 817, the pending activity reminder module 911 can remove any emails that are less than 5 days old. Therefore, even if an email message is the latest email from one of the sorted email groups, that email is still to be excluded from the email list since if it is received with the last 5 days.

In one embodiment, the email list, after being trimmed, can be provided as an input to a machine learning model 914 to analyze the content of the body of each email to determine if it needs a response. The machine learning model can be a neural network model trained on datasets generated by a number of sales teams over a period of time within a sales organization, and therefore is trained to make intelligent decisions as to which types of emails need a response and which types of emails do not. In one embodiment, the machine learning model 914 can be a software module with rules specifying which types of emails need a response. For example, if the only text in the body of an email is "thank you", the machine learning model can determine that the email does not need a reply.

After applying one or more settings in the configurations 817 and the machine learning model 914 to the email list, the pending activity reminder module 911 can generate a to-be-replied email list, for use in generating the list of tasks 718 for display in the voice UI 709.

Figure 10:
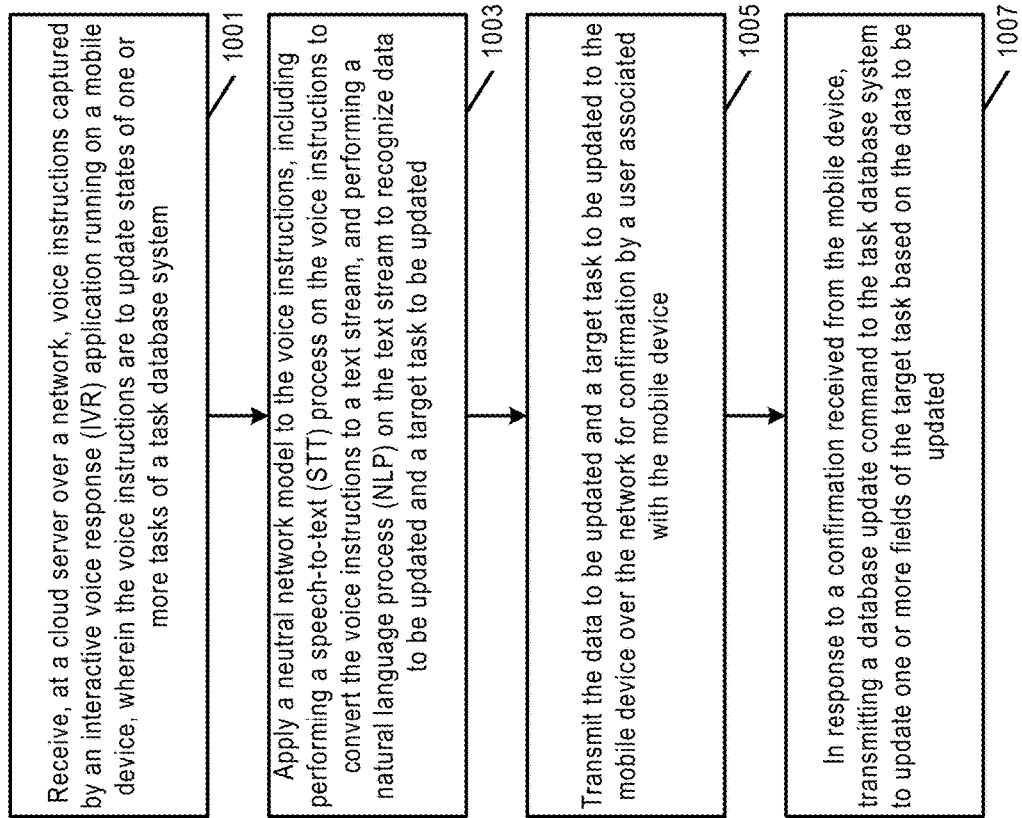
FIG. 10 illustrates a system for constructing a suggest task set, in accordance with an embodiment of the invention.

FIG. 10 illustrates an example of a process 1000 for capturing details from voice instructions to update tasks in a customer relationship management (CRM) system, in accordance with an embodiment.

As shown in FIG. 10, the process may be performed by process logic that includes software, hardware, or a combination thereof. For example, the process may be performed one or more of the IVR mobile application 705, the front-end server 210 or the machine learning server 309.

Referring to FIG. 10, in operation 1001, voice instructions captured by an interactive voice response (IVR) application running on a mobile device are received at a cloud server over a network. The voice instructions are to update states of one or more tasks of a task database system. In operation 1003, a neutral network model is applied to the voice instructions. When applying the neutral network model to the voice instruction, a speech-to-text (STT) process is performed on the voice instructions to convert the voice instructions to a text stream, and a natural language process (NLP) is also performed on the text stream to recognize data to be updated and a target task to be updated. In operation 1005, the data to be updated and a target task to be updated to the mobile device is transmitted over the network for confirmation by a user associated with the mobile device. In operation 1007, in response to a confirmation received from the mobile device, a database update command is transmitted to the task database system to update one or more fields of the target task based on the data to be updated.

Suggested Task Set

Resource allocation is critical for completing tasks in time in any organization. Given a target number for a particular period of time, project managers need to allocate sufficient resources for achieving the target number. One way to allocate resources is to use historical data as a guide to allocate existing resources to achieve the target number, e.g., a given sales target. Existing resources can include tasks at different stages in a task database such as a customer relationship management (CRM) system. Tasks can be deals (also referred to as projects or opportunities) in the task database. A task in the task database can may go through multiple predefined stages or cycles before being completed.

With historical data as a guide, project managers need the existing resources in the task database to be timely and accurately updated in order to appropriately allocate the resources to meet the given sale target. For example, if the given sales target requires a particular number of new tasks at the beginning of a quarter in the task database, and the task database has no new tasks, the project matter can hire new sales representatives to work on generating new tasks. As another example, if the given sales target requires a particular number of tasks at a certain advanced stage at the beginning of a quarter in the task database, and the task database has less than half of that number of tasks at that advanced stage, the project manager can shift more sales representatives to work on advancing tasks to that advanced stage. Therefore, timely and accurately updating a CRM database is critical in meeting a given sales target. Further, these data would eventually become historical data that can serve as a guide in resource planning for subsequent quarters.

The systems and methods described herein enable users to update the task database and enter information into the task database in a timely manner such that the task database can stay updated. The various embodiments can free users of CRM systems, such as sales representatives and marketing personnel, of the burden of manually keying-in the information. The time saved can be translated into more selling, thus generating more top line sales. The updated database can also be used to construct a suggested task set at the beginning of a period of time to meet a preset target sales value for the end of the period of time.

Figure 11:
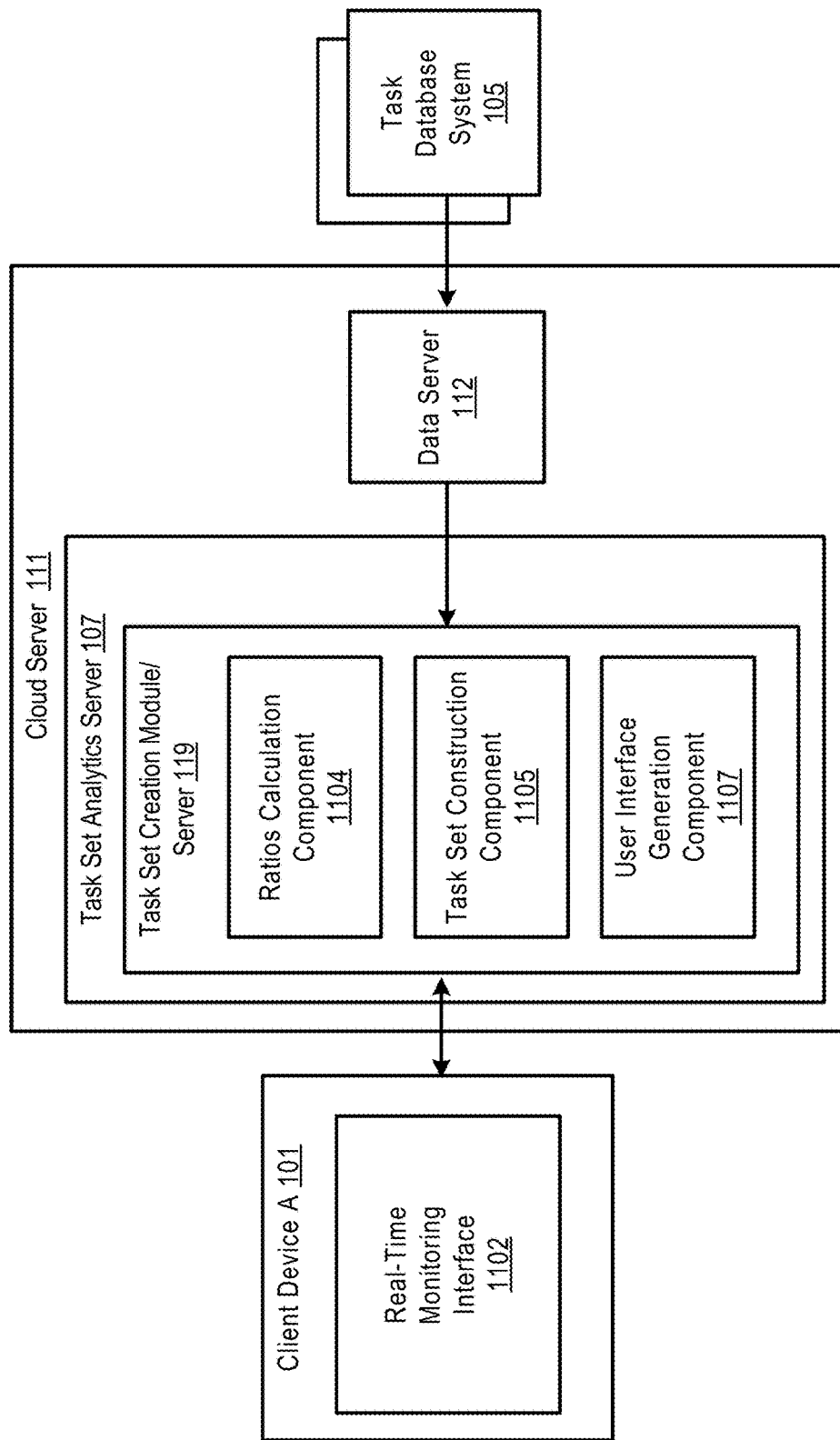
FIG. 11 illustrates a system for constructing a suggest task set, in accordance with an embodiment of the invention.

FIG. 11 illustrates a system for constructing a suggest task set, in accordance with an embodiment of the invention. As shown in FIG. 11, the task set creation module 119 can include components 1104-1107, each of which can perform one or more functions in creating the suggested task set.

The cloud server 111 can receive a request from the client device 101, for creating a suggested task set at a beginning of a particular future time period, for example, the first day of next quarter. The request also needs to specify a target value for the end of the particular future time period, for example, the last day of the quarter. The specified target value is the value that the suggested task set needs to achieve by the end of the particular future period.

In an embodiment, the suggested task set can be a pipeline with different categories of tasks. Each category of tasks can be in a different stage of procession in a life cycle of a task, and as such, can include one or more attributes and categories that other task categories do not have.

In response to receiving the request, the data server 112 can invoke an application programming interface (API) using a database query protocol to retrieve a number of completed task sets from the task database system 105. Each completed task set includes the same set of task categories, and each task category represents a different stage of progression in the life cycle of a task.

In an embodiment, each of the completed task sets is completed within a given period of time. For example, the first completed task set is started or constructed on the first day of the first quarter of a particular year and completed on the last day of the first quarter of the particular year, whereas a second completed task set is started or constructed on the first day of the second quarter of the particular year, and completed on the last day of the second quarter of the particular year.

In an embodiment, each completed task set can be a pipeline with existing tasks (pending tasks) and new tasks to be added to the pipeline. Therefore, the total number of tasks to be completed for a task set within a given time period includes: 1) tasks in pipeline $T_{pipeline}$; and 2) new tasks $T_{new}$ that have yet to be added. In one embodiment, each task is associated with a task value or task size representing the value of the task. Each task in a task set/pipeline can have a conversion/realization rate. With the realization rate of each task associated with a task set, the total realization value of the task set can be determined. In an embodiment, each task in a pipeline can have a nominal/pipeline value, which, for example, can represent a value assigned by an organization. In an embodiment, the data server 106 can save the preprocessed data, for use by the task set creation server 119 to create a suggested task set.

Ratios calculation component 1104 can be configured to calculate a number of ratios from the retrieved completed task sets. In an embodiment, the calculated ratios can include a composition ratio for each of plurality of task categories and an addition ratio for the completed tasks. The composition ratio is for each task category and represents a percentage of that task category in a completed task set. The conversion rate represents the possibility that the nominal value of a task category in a task set can be converted into a realized value. The addition ratio represents a ratio at which a total realized value of a completed task set increases over time.

In an embodiment, task set construction component 1105 can determine a total realized value for the suggested task set based on the specified target value and the addition ratio. Using the total realized value for the suggested task set, the conversion rate and composition ratio for each task category, the task set construction component 505 can construct the suggested task set, with each task category associated with a suggested pipeline/nominal value that would be realized into a value matching the corresponding conversion rate for that task category.

In an embodiment, each of the completed task sets was constructed and completed in one of a number of predetermined time periods, and each predetermined time periods matches the particular time period in length. The task categories in the suggested task set and in each completed task set represent different stages of procession in a life cycle of a task. For example, when a user tracks the progress of a task using "forecast category", the task categories may include "closed", "commit", "upside/Best Case", "pipeline", "not included", and "new".

User interface generation component 1107 can generate a real-time monitoring interface 1102 in the client device 101, and displays the suggested task set and the suggested task categories in the graphical user interface at a client device.

In an embodiment, the real-time monitoring interface can graphically display breakdowns of task categories of the suggested task set, and a current value for each task category in one or more dates before the beginning of the particular future time period, for which the suggested task set has been created. If a current value for a particular task category is below the suggested value for the task category by a predetermined amount, the current value can be shown in a different color or otherwise differently from current values for other task categories, so that users responsible for the suggested task set can allocate additional resources (e.g., deals/revenues/opportunities) to the task category.

FIG. 12 illustrates a table showing example historical task data that can be used to construct a suggested task set in accordance with an embodiment of the invention. Referring to FIG. 12, the table includes a number of rows. Each row corresponds to one task category, in this example, "closed," "commit," and "pipeline." These task categories are provided as examples; other task categories can be used. The column "Beginning of Future Quarter (Q)" column shows the values of tasks in each task category in the suggested task set for a future quarter.

Q-1 and Q-2 columns list example completed task sets in the two past quarters. Additional completed task sets from the two quarters can also be used. Data for the completed task sets shown in the Q-1 and Q-2 columns are retrieved from the task database system. Each completed task set includes the same set of task categories.

In an embodiment, for each task category in each completed task set, the cloud server can calculate a conversion rate. For example, for the completed task set shown in the column Q-1, the conversion rates for the task categories "Closed", "Commit", and "Pipeline" are respectively 100%, 75%, and 20%. The conversion rate for each task category represents a ratio of a realized value at the end of the quarter and a nominal value at the beginning of the quarter. As an illustrative example, for the task category "Closed", the conversion rate is 10/10=100%, which indicates all tasks in this task categories have been successfully closed.

As another example, for the task category "Pipeline", the conversion rate is 3/15=20%, which indicates tasks in this task category has a much lower possibility of being successfully closed. Similarly, for each task category in each completed task set, the cloud server can calculate a composition ratio. For example, for the completed task set shown in the column Q-1, the composition ratios for the task categories "Closed", "Commit", and "Pipeline" are respectively 45.4%, 40.9%, and 13.6%. The composition ratio for each task category represents a ratio of a realized value of the task category of a task set and a total realized value of the task set. For example, for the task category "Closed", the composition ratio is 10/(10+9+3)=45.5%.

Each task set in the table also includes new tasks that are added as the quarter progresses. For example, for the Q-1 column, a realized value of 10 from one or more new tasks has been added to the task set by the end of the quarter, representing an addition ratio of 45.4%. The addition ratio of 45.4% is a rate that the total realized value of the task set increases from the beginning of the quarter to the end of the quarter. For this particular task set shown in the Q-1 column, the total realized value from the task set at the beginning of the quarter is 10+9+3=22, and the total realized value at the end of the quarter is 32. Therefore, the addition ratio is 10/22=45.2%.

Based on the composition ratio and conversion rate for each task category in the past quarters, an average composition ratio and an average conversion rate over the past two quarters can be computed. For example, for the task category "Closed", the average composition ratio over the past two quarters is (45.5%+50%)/2=47.7%, and the average conversion rate over the two past quarters is (100%+100%)/2=100%.

As further shown in the table in FIG. 12, a target value of 50 for the suggested task set at the end of the future quarter can be specified by a request received at the cloud server for constructing the suggested task set for the beginning of the future time period. With the specified target value and the various ratios and rates previously calculated, the cloud server can contrast the suggest task set.

Based on the target value specified for the end of the future quarter and the average addition ratio over the past two quarters (i.e., (45.5%+62.5%)/2=54%), the cloud server can estimate a total realized value that the suggested task set needs to have in order to achieve the specified target value in view of the average addition ratio.

For example, as shown at the top row of the "Beginning of Future Quarter (Q)", the total realized value (R) is estimated to be 32.46 using the formula R=Target Value/(1+Average Addition Ratio.

With the total realized value (i.e., expected closed values) of the suggested task set at the beginning of the future quarter and an average composition ratio and conversion rate for each task category over the past two quarters, the nominal value for each task category in the suggested task set can be determined.

For example, for the task category "Commit", since the average composition ratio over the past two quarters is 47.7%, the expected closed value/realized value from one or more tasks in this task category would be calculated using the formula Total Realized Value (R)*Average Composition Ratio=32.46*47.7%=9.51. Based on the expected realized value for the task category and the average conversion rate for this task category, a nominal value for this task category can be determined by dividing the expected realized value with the average conversion ratio. For example, for the task category "Commit" in the suggested task set, the expected closed/realized value for the task category is 11.99, which can be translated a nominal value of 15.47 based on the average conversion rate for the task category. Similarly, nominal values for other task categories in the suggested task set can be determined.

In accordance with an alternative embodiment, the nominal values for each task category in the suggested task can be calculated without using the average conversion rate from the past quarters. In this embodiment, for the completed task sets from the past quarters, the cloud server can gather nominal values for each task category from the beginnings of the past quarter and realized values for that task category from the ends of the past quarters. Based on the total nominal value and the total realized value for each task category in the past quarters, and the total expected realized value for the suggested task set, the nominal value for each task category in the suggested task set can be computed without using an average conversion rate for each task category from the past quarters. The alternative embodiment uses the same raw data from the past, and provides a mathematic shortcut for calculating nominal values (i.e., pipeline values) for the task categories in the suggested task set.

Figure 13:
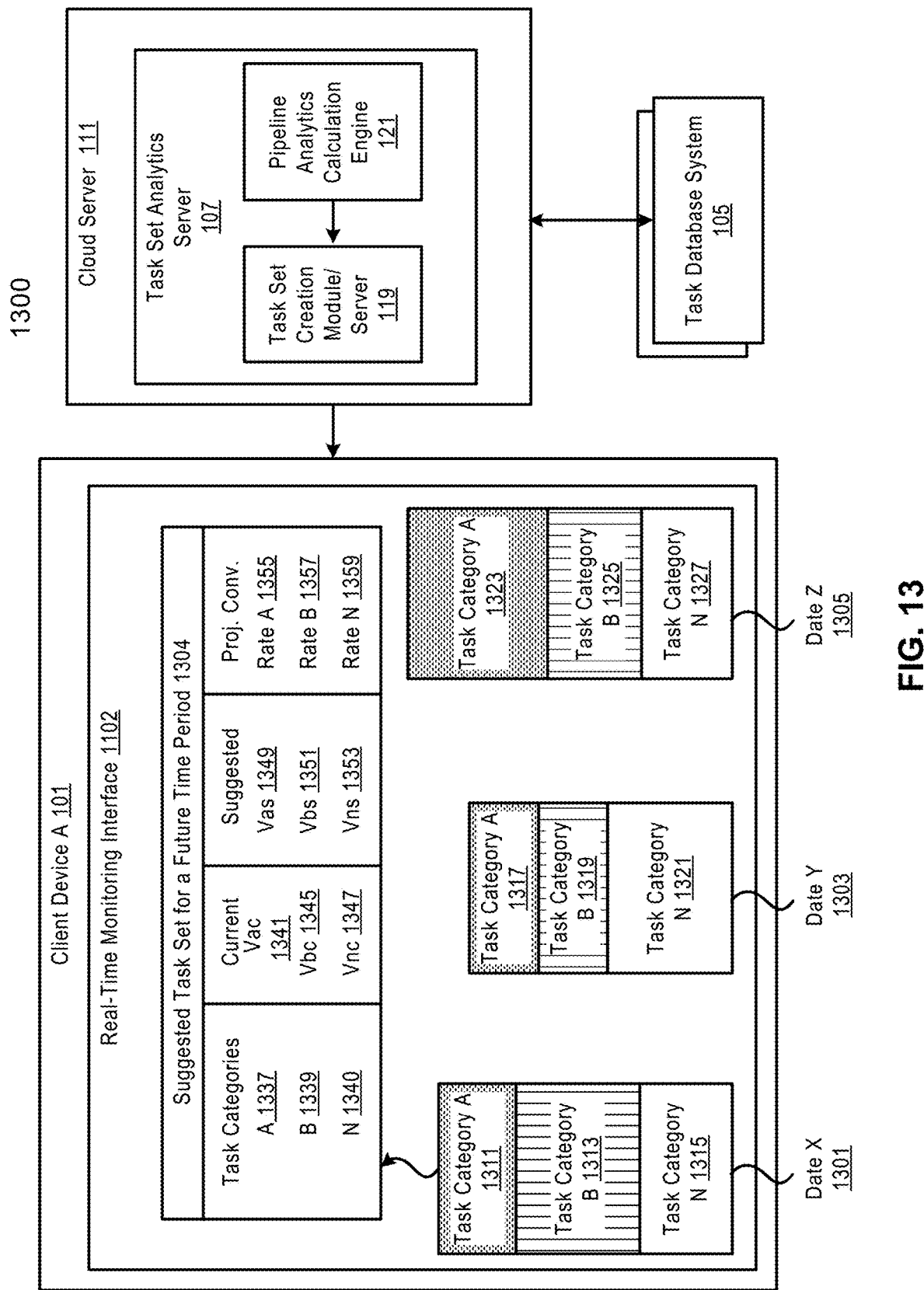
FIG. 13 further illustrates the real-time monitoring interface in accordance with an embodiment of the invention.

FIG. 13 further illustrates the real-time monitoring interface in accordance with an embodiment of the invention. As shown in FIG. 13, the real-time monitoring interface 202 can be generated by the task set creation server 119, and can display a suggested task set for a future time period. The real-time monitoring interface can graphically display values of task categories in the suggested task set on a number of dates (e.g., date X 1301, date Y 1304, and date 1305) before the beginning of the future time period.

For example, for each of date X 1301, date Y 1303, and date 1305 Z, a bar chart can be displayed with task category A 1311, 1317, or 1323; task category B 1313, 1319, or 1325; and task category N 1315, 1321, or 1327. The height of each bar chart on a particular date represents a projected realized value based on existing opportunities on the particular date. For example, a higher realized value can be expected on date Z than on date Y.

FIG. 13 also shows detailed breakdowns of the suggested task set and detailed breakdowns of task categories on each date at the selection of a user. For example, when a user clicks on the bar chart for the date X 1301, a popup window 1304 can be generated to display projected realized values 1341, 1345, and 1347 on date X 1301 for different task categories 1337, 1339, and 1340 and the corresponding values 1349, 1351, and 1353 in the suggested task. Project conversion rates 1355, 1357 and 1359 can also be displayed in the popup window 1304.

In accordance with an embodiment, if the projected realized value for a particular task category on a particular date is below the suggested value for the task category by a predetermined amount, the projected realized value would be shown in a different color or otherwise differently from projected realized values for other task categories, so that users responsible for the suggested task set can allocate additional resources (e.g., deals/revenues/opportunities) to the task category.

Figure 14:
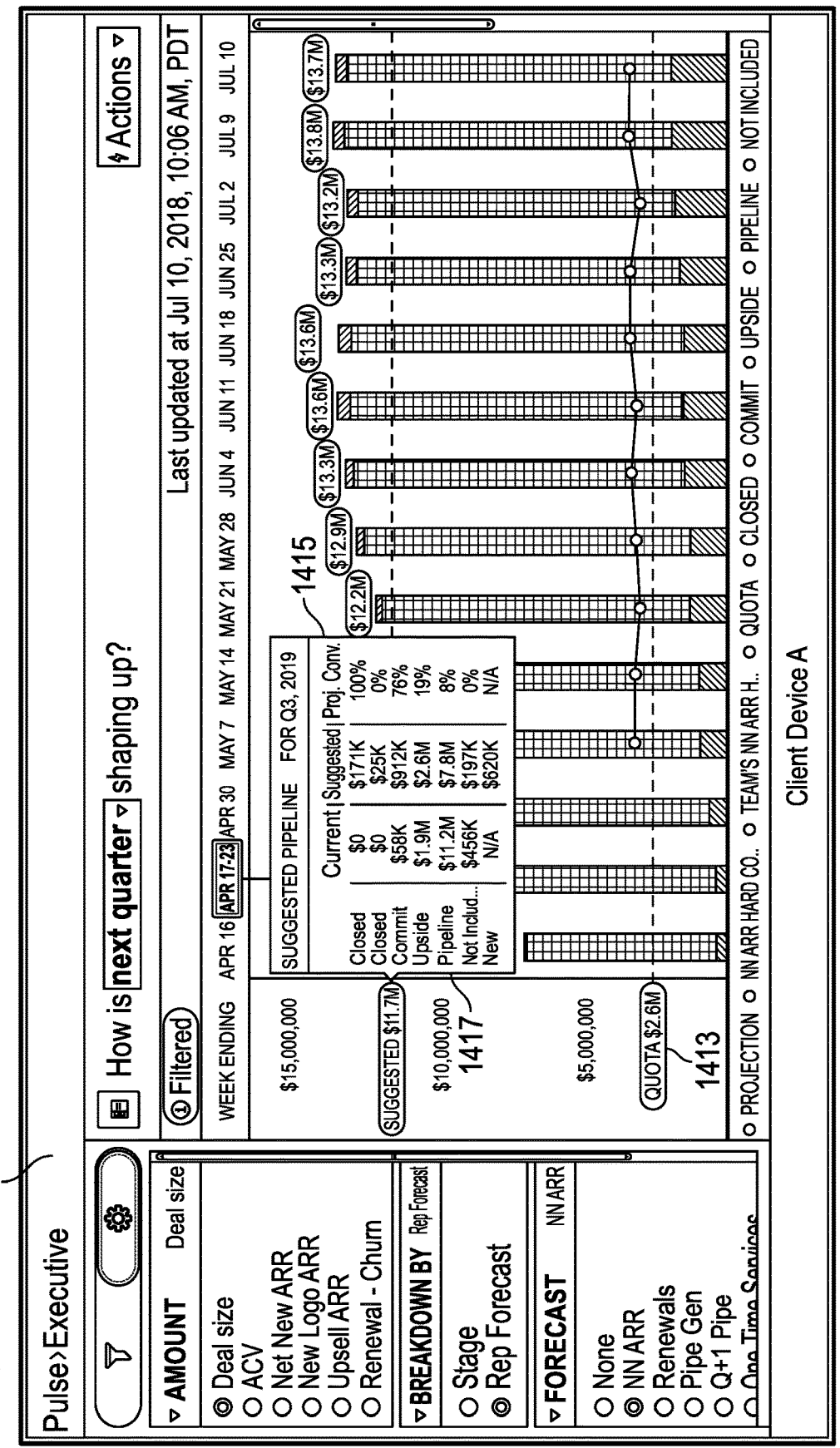
FIG. 14 illustrates a process for creating a suggest task set to meet a predetermined target value in accordance with an embodiment of the invention.

FIG. 14 further illustrates the real-time monitoring interface in accordance with an embodiment of the invention. As shown in FIG. 14, breakdowns by task categories of the suggested task set can be displayed in real-time in a graphical user interface in client device 101.

In the figure, a corresponding suggested pipeline 1415 on the first day of the next quarter is shown with detailed breakdowns to meet a target value/quota of $2.6 M 1413 for the next quarter. Current projected realized values for the task categories and their corresponding conversion rates derived from historical data are also shown in the figure. The task category 1417 is shown in a different color, since it is below the suggested value for the task category by a predetermined amount.

Additional measures can also be used to monitor the accuracy of the suggested pipeline analytics. For example, in a test quarter whose next quarter has already ended, pipeline analytics results on each day in the test quarter can be collected. The total suggested pipeline value on each day in the test quarter can be compared with the actual pipeline value on the first day of the next quarter. An average error can be calculated using the following metrics:

$$error_1 = 1 \bigg/ n\left( \sum_i \frac{(\text{Prediction on day } i - \text{Actual first day})}{\text{Actual first day revenue}} \right)$$

Further, besides iterating through all the dates in the test quarter, the cloud server also iterates through all the target dates in the next quarter. The cloud server can provide a suggested pipeline for each day of next quarter, instead of providing a suggested pipeline for the first day of the next quarter.

Figure 15:
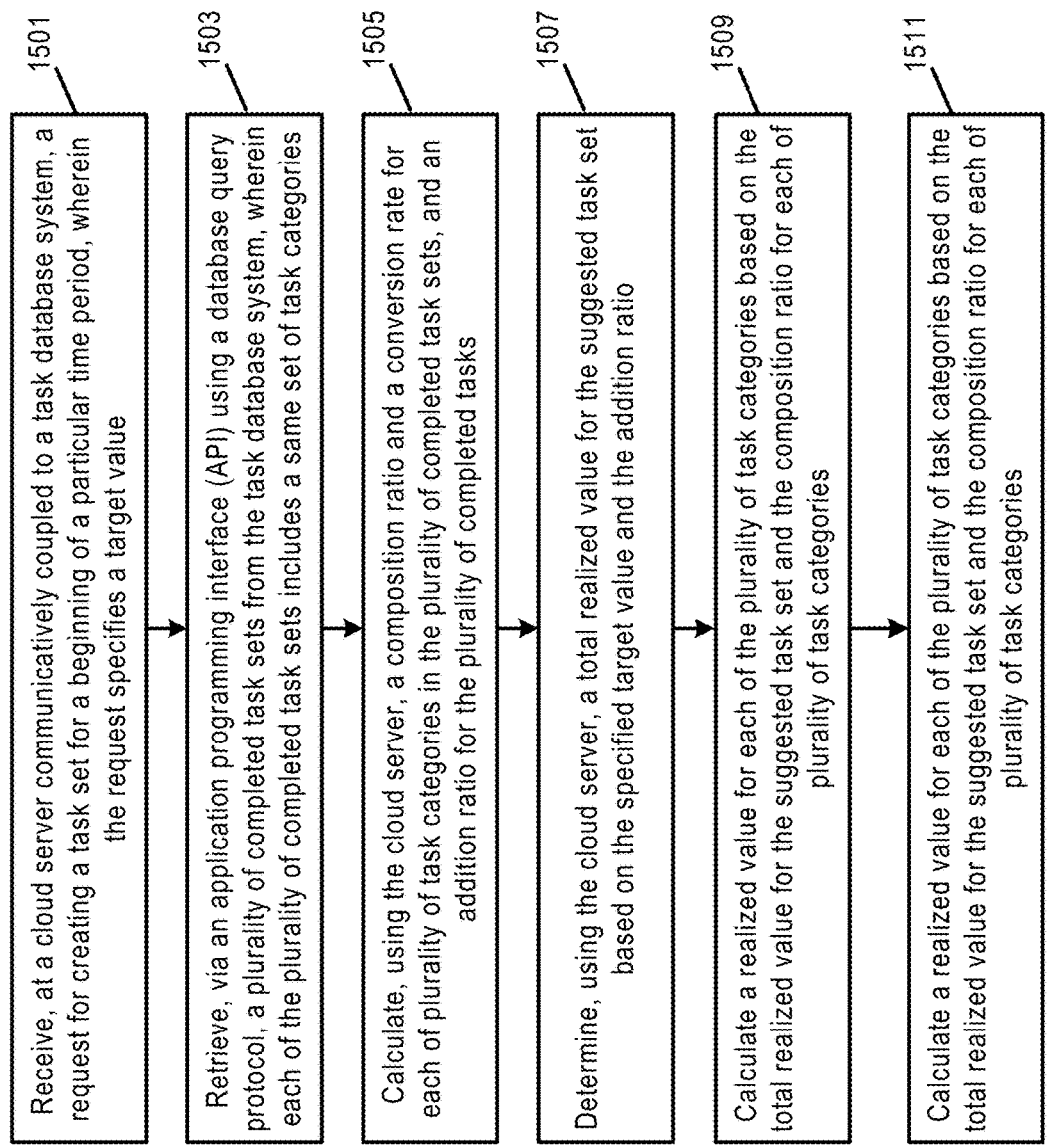
FIG. 15 illustrates an example of a process for capturing details from voice instructions to update tasks in a customer relationship management (CRM) system, in accordance with an embodiment.

FIG. 15 illustrates a process for creating a suggest task set to meet a predetermined target value in accordance with an embodiment of the invention. As shown in FIG. 15, the process may be performed by process logic that includes software, hardware, or a combination thereof. For example, the process may be performed by the task set creation module/server 119 and one or more other modules in the cloud server 111.

Referring to FIG. 15, in operation 1501, a cloud server having a memory and a processor over a network receives a request creating a task set for a beginning of a particular time period, and the request specifies a target value. In operation 1503, in response to the request, the cloud server retrieves, via an application programming interface (API) using a database query protocol, a number of completed task sets from the task database system, wherein each of the plurality of completed task sets includes a same set of task categories.

In operation 1505, the cloud server calculates, using the cloud server, a composition ratio and a conversion rate for each of plurality of task categories in the plurality of completed task sets, and an addition ratio for the plurality of completed tasks. In operation 1507, the cloud server determines, using the cloud server, a total realized value for the suggested task set based on the specified target value and the addition ratio. In operation 1509, the cloud server calculates a realized value for each of the plurality of task categories based on the total realized value for the suggested task set and the composition ratio for each of plurality of task categories. In operation 1511, the cloud server constructs, using the cloud server, the suggested task set with the plurality of task categories based on the conversion rate for each of the plurality of task categories and the realized value for that task category.

Figure 16:
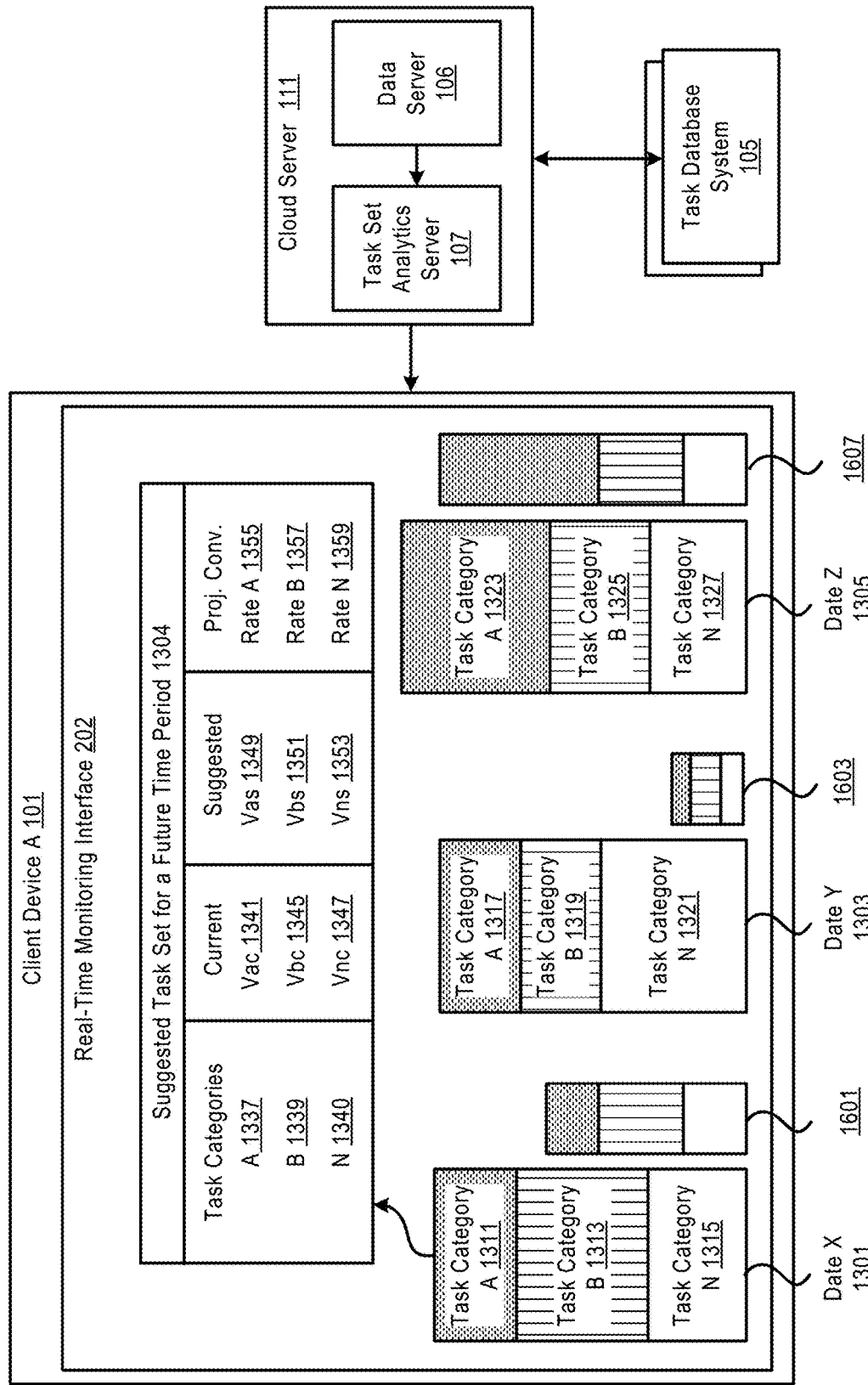
FIG. 16 further illustrates the real-time monitoring interface shown in FIG. 13 in accordance with an embodiment of the invention.

FIG. 16 further illustrates the real-time monitoring interface shown in FIG. 13 in accordance with an embodiment of the invention.

The real-time monitoring interface 1102 can be generated by the task set creation server 119, and can display a suggested task set for a future time period. The real-time monitoring interface 1102 can graphically display values of task categories in the suggested task set on a number of dates (e.g., date X 1301, date Y 1304, and date 1305) before the beginning of the future time period.

As further shown, FIG. 16 also includes a number of additional bar charts 1601, 1603, and 1607 for each of the number of dates before the beginning of the future time period. Each additional bar chat can show a breakdown of task categories available on the associated date. The task categories represented by each additional bar chart can be updated in real time in response to a user saving contact information captured from a physical medium using the point-snap-capture feature as a new task, or in response to a user saving task updates to an existing task using features described in FIGS. 2-10.

The available tasks with the most recent updates would enable a project manager or a sales team supervisor to determine whether to hire more sales representatives in order to generate enough task resources to construct the suggested task set to meet a sales target by the end of the future time period.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 17:
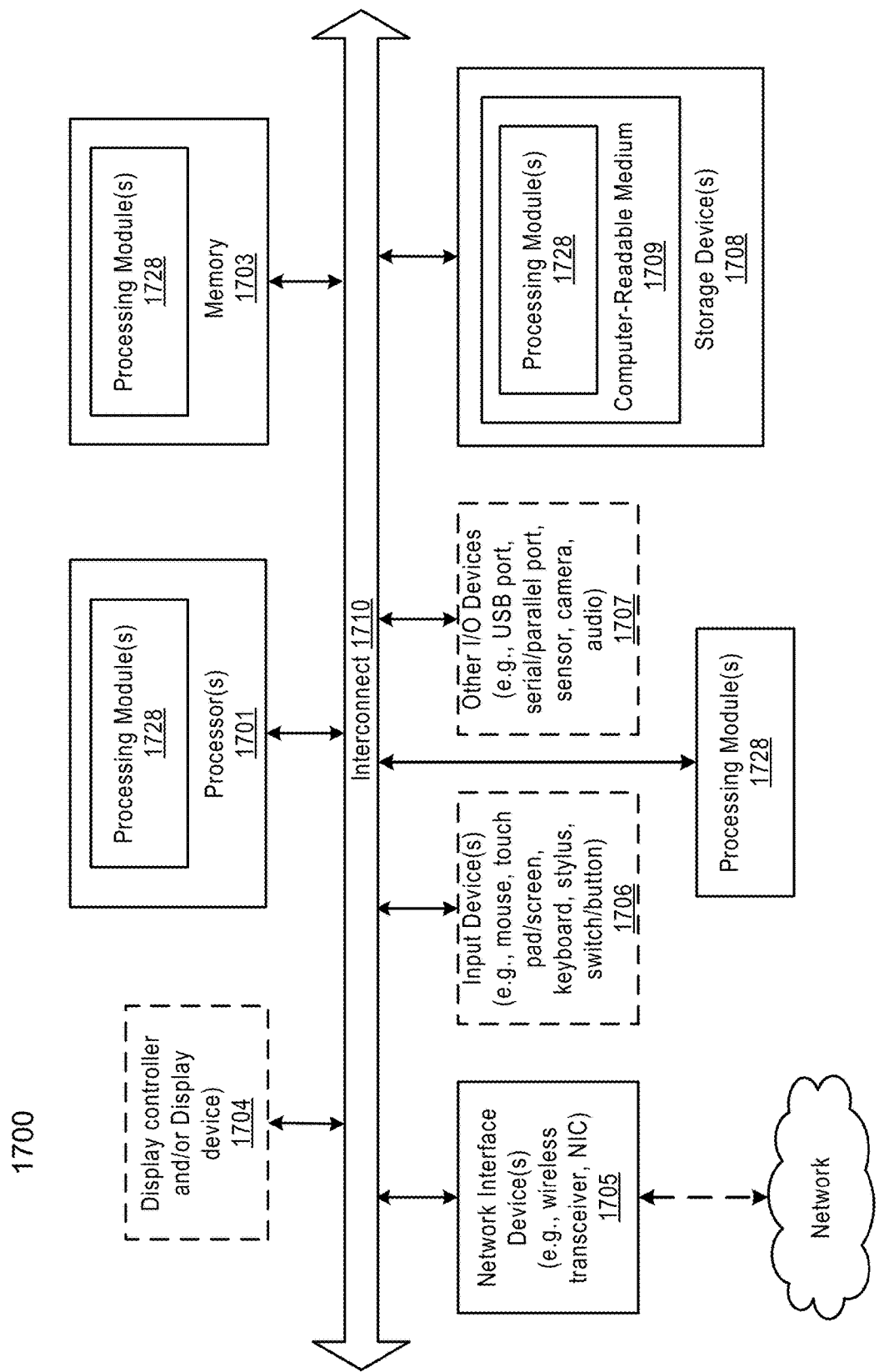
FIG. 17 is a block diagram illustrating an example of a data processing system which may be used with one or more embodiments of the invention.

FIG. 17 is a block diagram illustrating an example of a data processing system which may be used with one or more embodiments of the invention. For example, system 1700 may represent any of data processing systems described above performing any of the processes of methods described above, such as, for example, client devices 101-102 and servers 105-107 and 111 of FIG. 1. System 1700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1700 is intended to show a high level view of many components of the computer system. However, it is to be understood that additional components may be present in certain implementations and furthermore, different arrangement of the components shown may occur in other implementations. System 1700 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1700 includes processor 1701, memory 1703, and devices 1705-1708 via a bus or an interconnect 1710. Processor 1701 may represent a single processor or multiple processors with a single processor core or multiple processor cores included therein. Processor 1701 may represent one or more general-purpose processors such as a microprocessor, a central processing unit (CPU), or the like. More particularly, processor 1701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1701, which may be a low power multi-core processor socket such as an ultra-low voltage processor, may act as a main processing unit and central hub for communication with the various components of the system. Such processor can be implemented as a system on chip (SoC). Processor 1701 is configured to execute instructions for performing the operations and steps discussed herein. System 1700 may further include a graphics interface that communicates with optional graphics subsystem 1704, which may include a display controller, a graphics processor, and/or a display device.

Processor 1701 may communicate with memory 1703, which in one embodiment can be implemented via multiple memory devices to provide for a given amount of system memory. Memory 1703 may include one or more volatile storage (or memory) devices such as random access memory (RAM), dynamic RAM (DRAM), synchronous DRAM (SDRAM), static RAM (SRAM), or other types of storage devices. Memory 1703 may store information including sequences of instructions that are executed by processor 1701, or any other device. For example, executable code and/or data of a variety of operating systems, device drivers, firmware (e.g., input output basic system or BIOS), and/or applications can be loaded in memory 1703 and executed by processor 1701. An operating system can be any kind of operating systems, such as, for example, Windows® operating system from Microsoft®, Mac OS®/iOS® from Apple, Android® from Google® Linux® Unix®, or other real-time or embedded operating systems such as VxWorks.

System 1700 may further include IO devices such as devices 1705-1708, including network interface device(s) 1705, optional input device(s) 1706, and other optional IO device(s) 1707. Network interface device 1705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1706 may include a mouse, a touch pad, a touch sensitive screen (which may be integrated with display device 1704), a pointer device such as a stylus, and/or a keyboard (e.g., physical keyboard or a virtual keyboard displayed as part of a touch sensitive screen). For example, input device 1706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1707 may include an audio device. An audio device may include a speaker and/or a microphone to facilitate voice-enabled functions, such as voice recognition, voice replication, digital recording, and/or telephony functions. Other IO devices 1707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1710 via a sensor hub (not shown), while other devices such as a keyboard or thermal sensor may be controlled by an embedded controller (not shown), dependent upon the specific configuration or design of system 1700.

To provide for persistent storage of information such as data, applications, one or more operating systems and so forth, a mass storage (not shown) may also couple to processor 1701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1701, e.g., via a serial peripheral interface (SPI). This flash device may provide for non-volatile storage of system software, including a basic input/output software (BIOS) as well as other firmware of the system.

Storage device 1708 may include computer-accessible storage medium 1709 (also known as a machine-readable storage medium or a computer-readable medium) on which is stored one or more sets of instructions or software (e.g., module, unit, and/or logic 1728) embodying any one or more of the methodologies or functions described herein. Processing module/unit/logic 1728 may represent any of the components described above, such as, for example, task manager 210, activity manager 220, and the pending activity reminder module 121, as described above. Processing module/unit/logic 172 may also reside, completely or at least partially, within memory 1703 and/or within processor 1701 during execution thereof by data processing system 1700, memory 1703 and processor 1701 also constituting machine-accessible storage media. Processing module/unit/logic 1728 may further be transmitted or received over a network via network interface device 1705.

Computer-readable storage medium 1709 may also be used to store some software functionalities described above persistently. While computer-readable storage medium 1709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1728, components and other features described herein can be implemented as discrete hardware components or integrated in the functionality of hardware components such as ASICS, FPGAs, DSPs or similar devices. In addition, processing module/unit/logic 1728 can be implemented as firmware or functional circuitry within hardware devices. Further, processing module/unit/logic 1728 can be implemented in any combination hardware devices and software components.

Note that while system 1700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for updating a task database system, the method comprising:
receiving, at a cloud server over a network, an image captured by a camera of a mobile device, wherein the image captures content information printed on a physical medium;
applying a neutral network model to the image, including
applying a convolutional neural network (CNN) to the image to extract a textual description of the image, and
applying a long short-time memory (LSTM) network to the textual description to generate one or more first phrases describing contact information of a user; and
transmitting a database update command to the task database system to update the contact information of the user stored in a target task based on the one or more first phrases.

2. The method of claim 1, further comprising:
transmitting the one or more first phrases to the mobile device to be displayed at the mobile device to confirm the contact information of the user; and
receiving a confirmation from the mobile device, wherein the database update command is transmitted in response to the confirmation received from the mobile device.

3. The method of claim 2, further comprising receiving one or more second phrases from the mobile device, wherein the second phrases are modified at the mobile device based on the first phrases transmitted to the mobile device, wherein the contact information of the user is updated based on the second phrases.

4. The method of claim 1, further comprising:
identifying a list of one or more tasks associated with the user from the task database system; and
modifying one or more attributes of each of the tasks in the list based on the first phrases.

5. The method of claim 1, further comprising:
determining whether there is an existing contact of the user in the task database system; and
creating a new contact for the user in the task database system based on the first phrases.

6. The method of claim 5, further comprising modifying the existing contact of the user based on the first phrases, in response to determining that there is an existing contact of the user in the task database system.

7. The method of claim 6, further comprising resolving a conflict between the first phrases and the existing contact of the user using a predetermined algorithm prior to modifying the existing contact.

8. The method of claim 1, wherein the first phrases comprise at least one of a name, an address, a phone number, an email address, or a universal resource locator (URL) link.

9. The method of claim 1, wherein the physical medium comprises a user identification card.

10. A non-transitory machine-readable medium having instructions stored therein, which when executed by a processor, cause the processor to perform operations of updating a task database system, the operations comprising:
receiving, at a cloud server over a network, an image captured by a camera of a mobile device, wherein the image captures content information printed on a physical medium;
applying a neutral network model to the image, including
applying a convolutional neural network (CNN) to the image to extract a textual description of the image, and
applying a long short-time memory (LSTM) network to the textual description to generate one or more first phrases describing contact information of a user; and
transmitting a database update command to the task database system to update the contact information of the user stored in a target task based on the one or more first phrases.

11. The machine-readable medium of claim 10, wherein the operations further comprise:
transmitting the one or more first phrases to the mobile device to be displayed at the mobile device to confirm the contact information of the user; and
receiving a confirmation from the mobile device, wherein the database update command is transmitted in response to the confirmation received from the mobile device.

12. The machine-readable medium of claim 11, wherein the operations further comprise receiving one or more second phrases from the mobile device, wherein the second phrases are modified at the mobile device based on the first phrases transmitted to the mobile device, wherein the contact information of the user is updated based on the second phrases.

13. The machine-readable medium of claim 10, wherein the operations further comprise:
   identifying a list of one or more tasks associated with the user from the task database system; and
   modifying one or more attributes of each of the tasks in the list based on the first phrases.

14. The machine-readable medium of claim 10, wherein the operations further comprise:
   determining whether there is an existing contact of the user in the task database system; and
   creating a new contact for the user in the task database system based on the first phrases.

15. The machine-readable medium of claim 14, wherein the operations further comprise modifying the existing contact of the user based on the first phrases, in response to determining that there is an existing contact of the user in the task database system.

16. The machine-readable medium of claim 15, wherein the operations further comprise resolving a conflict between the first phrases and the existing contact of the user using a predetermined algorithm prior to modifying the existing contact.

17. The machine-readable medium of claim 10, wherein the first phrases comprise at least one of a name, an address, a phone number, an email address, or a universal resource locator (URL) link.

18. The machine-readable medium of claim 10, wherein the physical medium comprises a user identification card.

19. A data processing system, comprising:
   a processor; and
   a memory coupled to the processor to store instructions, which when executed by the processor, cause the processor to perform operations of updating a task database system, the operations including
      receiving, at a cloud server over a network, an image captured by a camera of a mobile device, wherein the image captures content information printed on a physical medium;
      applying a neutral network model to the image, including
         applying a convolutional neural network (CNN) to the image to extract a textual description of the image, and
         applying a long short-time memory (LSTM) network to the textual description to generate one or more first phrases describing contact information of a user; and
      transmitting a database update command to the task database system to update the contact information of the user stored in a target task based on the one or more first phrases.

20. The system of claim 19, wherein the operations further comprise:
   transmitting the one or more first phrases to the mobile device to be displayed at the mobile device to confirm the contact information of the user; and
   receiving a confirmation from the mobile device, wherein the database update command is transmitted in response to the confirmation received from the mobile device.

21. The system of claim 20, wherein the operations further comprise receiving one or more second phrases from the mobile device, wherein the second phrases are modified at the mobile device based on the first phrases transmitted to the mobile device, wherein the contact information of the user is updated based on the second phrases.

22. The system of claim 19, wherein the operations further comprise:
   identifying a list of one or more tasks associated with the user from the task database system; and
   modifying one or more attributes of each of the tasks in the list based on the first phrases.

* * * * *